(12) United States Patent
Wang et al.

(10) Patent No.: US 9,372,785 B2
(45) Date of Patent: Jun. 21, 2016

(54) IDENTIFYING IMPLICIT ASSUMPTIONS ASSOCIATED WITH A SOFTWARE PRODUCT

(71) Applicant: Microsoft Corporation, Redmond, WA (US)

(72) Inventors: Rui Wang, Redmond, WA (US); Yuchen Zhou, Charlottesville, VA (US); Shuo Chen, Bellevue, WA (US); Shaz Qadeer, Seattle, WA (US); Yuri Gurevich, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 369 days.

(21) Appl. No.: 13/787,859

(22) Filed: Mar. 7, 2013

(65) Prior Publication Data

US 2014/0258986 A1 Sep. 11, 2014

(51) Int. Cl.
*G06F 11/36* (2006.01)
*G06F 9/44* (2006.01)

(52) U.S. Cl.
CPC .............. *G06F 11/3684* (2013.01); *G06F 8/73* (2013.01)

(58) Field of Classification Search
CPC . G06F 21/577; G06F 2221/033; G06F 21/54; G06F 11/3612; G06F 11/3684; G06F 21/562; G06F 21/31; G06F 21/563; G06F 2221/034; H04L 63/1433; H04L 63/1416; H04L 63/1441; H04L 67/02; H04L 63/102
See application file for complete search history.

(56) References Cited

U.S. PATENT DOCUMENTS

| | | | | |
|---|---|---|---|---|
| 7,549,144 | B2 * | 6/2009 | Jubran | G06F 8/20 717/124 |
| 8,347,392 | B2 * | 1/2013 | Chess | G06F 21/54 717/124 |
| 8,353,033 | B1 * | 1/2013 | Chen et al. | 726/22 |
| 8,407,800 | B2 * | 3/2013 | Schloegel et al. | 726/25 |
| 2003/0120707 | A1 | 6/2003 | Bogdan et al. | |
| 2006/0168553 | A1 | 7/2006 | Drennan | |
| 2006/0190923 | A1 * | 8/2006 | Jubran | G06F 8/20 717/104 |

(Continued)

FOREIGN PATENT DOCUMENTS

WO 2009142689 A1 11/2009

OTHER PUBLICATIONS

Pistoia, Marco, et al. "A survey of static analysis methods for identifying security vulnerabilities in software systems." IBM Systems Journal 46.2 (2007): 265-288.Retrieved on [Mar. 2, 2016] Retrieved from the Internet: URL<http://ieeexplore.ieee.org/xpls/abs_all.jsp?arnumber=5386616&tag=1>.*

(Continued)

*Primary Examiner* — Thuy Dao
*Assistant Examiner* — Cheneca Smith
(74) *Attorney, Agent, or Firm* — Steve Wight; Sandy Swain; Micky Minhas

(57) ABSTRACT

A framework is described herein for identifying implicit assumptions associated with an SDK and its accompanying documentation (e.g., dev guide). An implicit assumption is information that is not expressly stated in the documentation, but which would be useful in assisting an application developer in building an application. The framework also describes a systematic approach for identifying one or more vulnerability patterns based on the identified implicit assumptions. An application developer may run a test on an application that is being developed to ensure that it does not have any deficiency which matches a vulnerability pattern.

20 Claims, 14 Drawing Sheets

(56) References Cited

U.S. PATENT DOCUMENTS

| | | | | |
|---|---|---|---|---|
| 2007/0074188 | A1* | 3/2007 | Huang | G06F 21/54 717/141 |
| 2010/0083240 | A1* | 4/2010 | Siman | G06F 8/433 717/144 |
| 2010/0192120 | A1 | 7/2010 | Raleigh | |
| 2010/0281248 | A1* | 11/2010 | Lockhart et al. | 713/150 |
| 2011/0126288 | A1* | 5/2011 | Schloegel et al. | 726/25 |
| 2012/0072968 | A1* | 3/2012 | Wysopal | G06F 11/3612 726/1 |
| 2012/0233589 | A1 | 9/2012 | Mruthyunjaya et al. | |
| 2012/0266229 | A1 | 10/2012 | Simone et al. | |
| 2013/0005322 | A1 | 1/2013 | Raleigh | |
| 2013/0132565 | A1* | 5/2013 | Cetin | H04L 65/40 709/224 |
| 2014/0173571 | A1* | 6/2014 | Gluck | G06F 21/54 717/130 |

OTHER PUBLICATIONS

Beckert, Bernhard, et al. "Intelligent systems and formal methods in software engineering." Intelligent Systems, IEEE 21.6 (2006): 71-81. Retrieved on [Mar. 2, 2016] Retrieved from the Internet: URL<http://ieeexplore.ieee.org/xpls/abs_all.jsp?arnumber=4042539>.*

Gunawardena, et al., "Colombo SDK—Simulating the Innards of a Wireless MAC," retrieved at <<http://research.microsoft.com/en-us/projects/colombosdk/colombosdkoverview.pdf>>, Proceedings of the 17th Annual International Conference on Mobile Computing and Networking, Sep. 2011, 7 pages.

"PowerPC/AIX Port Project," retrieved at <<http://openjdk.java.net/projects/ppc-aix-port/>>, retrieved on Feb. 5, 2013, Oracle Corporation, Redwood City, California, 2 pages.

Smith, Daniel, "Intel AppUp Software Development Kit Developer Guide for Java technology," retrieved at <<http://software.intel.com/en-us/articles/intel-appup-software-development-kit-developer-guide-for-java-technology#SDK_Contents>>, Intel Corporation, Santa Clara, California, Mar. 16, 2011, 23 pages.

Ball, et al., "Thorough Static Analysis of Device Drivers," retrieved at <<http://acm.org>>, Proceedings of the 1st ACM SIGOPS/EuroSys European Conference on Computer Systems, Apr. 2006, pp. 73-85.

Bansal, et al., "Discovering Concrete Attacks on Website Authorization by Formal Analysis," retrieved at <<http://moscova.inria.fr/~karthik/pubs/discovering_concrete_attacks_csf12.pdf>>, Proceedings of the 2012 IEEE 25th Computer Security Foundations Symposium, Jun. 2012, 16 pages.

Bradley, John, "The problem with OAuth for Authentication," retrieved at <<http://www.thread-safe.com/2012/01/problem-with-oauth-for-authentication.html!/2012/01/problem-with-oauth-for-authentication.html>>, Thread Safe: Posts about Identity and Federated Identity issues, Jan. 29, 2012, 7 pages.

Chen, et al., "Setuid Demystified," retrieved at <<http://unixwiz.net/techtips/mirror/setuid-usenix02.pdf>>, Proceedings of 11th USENIX Security Symposium, Aug. 2002, 20 pages.

"Facebook SDK for PHP," retrieved at <<http://developers.facebook.com/docs/reference/php/>>, retrieved on Mar. 7, 2013, Facebook, Inc., Menlo Park, California, 2 pages.

"Facebook-php-sdk," retrieved at <<https://github.com/facebook/facebook-php-sdk/blob/master/readme.md>>, retrieved on Mar. 7, 2013, Facebook, Inc., Menlo Park, California, 4 pages.

"How-To: Use an App Access Token," retrieved at <<https://developers.facebook.com/docs/technical-guides/opengraph/publishing-with-app-token/>>, retrieved on Mar. 7, 2013, Facebook, Inc., Menlo Park, California, 2 pages.

Georgiev, et al., "The Most Dangerous Code in the World: Validating SSL Certificates in Non-Browser Software," Retrieved at <<http://acm.org>>, Proceedings of the ACM Conference on Computer and Communications Security, Oct. 16, 2012, pp. 38-49.

"Using OAuth 2.0 to Access Google APIs," retrieved at https://developers.google.com/accounts/docs/OAuth2>>, retrieved on Mar. 7, 2013, Google Inc., Menlo Park, California, 6 pages.

Hardt, D. (Ed), "The OAuth 2.0 Authorization Framework," retrieved at <<http://tools.ietf.org/pdf/rfc6749.pdf>>, Internet Engineering Task Force, Request for Comments: 6749, Oct. 2012, 77 pages.

Lal, et al., "Corral: A Solver for Reachability Modulo Theories," retrieved at <<http://research.microsoft.com/pubs/148752/techreport.pdf>>, Microsoft Technical Report, MSR-TR-2012-09, Apr. 2012, Microsoft Corporation, Redmond, Washington, 22 pages.

"Windows Store apps (Live Connect)," retrieved at <<http://msdn.microsoft.com/en-us/library/live/hh826551.aspx>>, retrieved on Mar. 7, 2013, Microsoft Corporation, Redmond, Washington, 4 pages.

"Live SDK developer guide (Live Connect)," retrieved at <<http://msdn.microsoft.com/en-us/library/live/hh243641#signin>>, retrieved on Mar. 7, 2013, Microsoft Corporation, Redmond, Washington, 53 pages.

"Single sign-on for apps and websites (Live Connect)," retrieved at <<http://msdn.microsoft.com/en-us/library/live/hh826544.aspx>>, retrieved on Feb. 1, 2013, Microsoft Corporation, Redmond, Washington, 4 pages.

"Rest Reference (Live Connect)," retrieved at <<http://msdn.microsoft.com/en-us/library/live/hh243648.aspx>>, retrieved on Feb. 1, 2013, Microsoft Corporation, Redmond, Washington, 63 pages.

"Windows.Security.Authentication.Web Namespace (Windows)," retrieved at <<http://msdn.microsoft.com/library/windows/apps/BR227044>>, retrieved on Feb. 1, 2013, Microsoft Corporation, Redmond, Washington, 2 pages.

"Poirot: The Concurrency Sleuth," retrieved at <<http://research.microsoft.com/en-us/projects/poirot/>>, retrieved on Feb. 1, 2013, Microsoft Corporation, Redmond, Washington, 2 pages.

Sun, et al., "The Devil is in the (Implementation) Details: An Empirical Analysis of OAuth SSO Systems," retrieved at <<http://acm.org>>, Proceedings of the ACM Conference on Computer and Communications Security, Oct. 16, 2012, pp. 378-390.

Wang, et al., "How to Shop for Free Online—Security Analysis of Cashier-as-a-Service based Web Stores," retrieved at <<http://ieeexplore.ieee.org/stamp/stamp.jsp?tp=&arnumber=5958046>>, Proceedings of the IEEE Symposium on Security and Privacy, May 22, 2011, pp. 465-480.

Wang, at al., "Signing Me onto Your Accounts through Facebook and Google: A Traffic-Guided Security Study of Commercially Deployed Single-Sign-On Web Services," retrieved at <<http://www.informatics.indiana.edu/xw7/papers/websso.pdf>>, Proceedings of the IEEE Symposium on Security and Privacy (Oakland), May 2012, 16 pages.

Cadar, et al., "Symbolic Execution for Software Testing: Three Decades Later," retrieved at <<http://acm.org>>, Communications of the ACM, vol. 56., No. 2, Feb. 2013, pp. 82-90.

International Search Report for WO 2010/088087 A1, mailed on Mar. 3, 2010, 1 page.

International Search Report & Written Opinion for PCT Application No. PCT/US2014/020058, mailed on Jun. 4, 2014, 7 pages.

Alur et al., "Synthesis of Interface Specifications for Java Classes," 32nd ACM SIGPLAN-SIGACT Symposium on Principles of Programming Languages (POPL), 2005, pp. 98-109, 12 pages.

Avgerinos et al., "AEG: Automatic Exploit Generation," Network and Distributed System Security Symposium (NDSS), Feb. 2011, 19 pages.

Bai et al., "AUTHSCAN: Automatic Extraction of Web Authentication Protocols from Implementations," Network and Distributed System Security Symposium (NDSS), Feb. 2013, 20 pages.

Beyer et al., "Web Service Interfaces," 14th International Conference on World Wide Web (WWW), 2005, pp. 148-159, 12 pages.

Blanchet, Bruno, "An Efficient Cryptographic Protocol Verifier Based on Prolog Rules," 14th IEEE Computer Security Foundations Workshop (CSFW), 2001, 15 pages.

Cho et al., "MACE: Model-inference-Assisted Concolic Exploration for Protocol and Vulnerability Discovery," 20th USENIX Security Symposium, 2011, 16 pages.

De Alfaro et al., "Interface Automata," 8th European Software Engineering Conference (held jointly with 9th ACM SIGSOFT International Symposium on Foundations of Software Engineering), 2001, pp. 109-120, 12 pages.

(56) References Cited

OTHER PUBLICATIONS

Doupe et al., "Enemy of the State: a State-Aware Black-Box Web Vulnerability Scanner," 21st USENIX Security Symposium, 2012, 16 pages.
Godefroid et al., "Automated Whitebox Fuzz Testing," Network and Distributed System Security Symposium, 2008, 16 pages.
Pai et al., "Formal Verification of Oauth 2.0 Using Alloy Framework," Communication Systems and Network Technologies (CSNT), Jun. 3-5, 2011, pp. 655-659, 5 pages.
Spinellis et al., "A framework for the static verification of API calls," Journal of Systems and Software, vol. 80, Issue 7, Jul. 2007, pp. 1156-1168, 13 pages.
Turing, Alan, "Checking a large routine," presented at EDSAC Inaugural Conference, 1949, 3 pages.
Wang et al., "Explicating SDKs: Uncovering Assumptions Underlying Secure Authentication and Authorization", Proceedings of the 22nd USENIX Security Symposium, Washington DC, Aug. 14-16, 2013, 16 pages.
International Preliminary Report on Patentability mailed Sep. 17, 2015 from PCT Patent Application No. PCT/US2014/020058, 6 pages.
Voluntary Amendment filed Sep. 3, 2015 to European Patent Application No. 14712873.0, 18 pages.
Voluntary Amendment filed May 4, 2016 from China Patent Application No. 201480012437.5, 10 pages.
Facebook, "OAuth Dialog," retrieved at <<https://developers.facebook.com/docs/reference/dialogs/oauth/>>, Jan. 22, 2013, 2 pages.
Facebook, "The Facebook Bounty Program," retrieved at <<http://www.facebook.com/whitehat/bounty/>>, Feb. 17, 2013, 1 pages.
Facebook, "Using App Access Tokens", retrieved at <<http://developers.facebook.com/docs/opengraph/using-app-tokens/>>, Oct. 6, 2012, 2 pages.
Jackson, Daniel, "Alloy: A Language and Tool for Relational Models," retrieved at <<http://alloy.mit.edu/alloy/index.html>>, Jul. 22, 2012, 1 page.
"Boogie: An Intermediate Verification Language," retrieved at <<http://research.microsoft.com/en-us/projects/boogie/>>, Nov. 17, 2012, 2 pages.
SDK Semantic Models to Share with SDK Providers, retrieved at <<https://github.com/sdk-security/implicit-assumptions>>, Feb. 1, 2013, 3 pages.

* cited by examiner

IDENTIFYING IMPLICIT ASSUMPTIONS ASSOCIATED WITH A SOFTWARE PRODUCT

BACKGROUND

An application developer may build an application that relies on a software development kit (SDK). The application developer may also consult a developer guide (simply "guide" herein) in building the application. The guide provides information regarding the recommended use of the SDK. The guide is typically produced in an ad hoc manner, e.g., based on an informal assessment of the informational needs of the application developer.

An application developer may produce a faulty application when he or she fails to follow the instructions provided in the guide. This is to be expected. In other cases, a developer may precisely follow the instructions of the guide, yet still produce a faulty application.

SUMMARY

A software development environment is described herein which includes an analysis module and a test suite production module. The analysis module analyzes a software product (e.g., an SDK) in conjunction with documentation (e.g., a dev guide) that describes a recommended use of the software product. This analysis can be used to identify at least one implicit assumption associated with the software product and the documentation. An implicit assumption corresponds to information that: (a) would be useful to the application developer in building an application that satisfies a stated objective; and (b) is not explicitly stated in the documentation. In one case, the stated objective is a security-related objective associated with a software product that performs an authentication and/or authorization operation.

The test suit production module produces a test suite that is made up of one or more vulnerability patterns. Each vulnerability pattern corresponds to an implied assumption identified by the analysis module. The application developer can test his or her application against each vulnerability pattern. This will reveal whether the application suffers from a vulnerability that is associated with the vulnerability pattern. The application developer can then modify the application in an appropriate manner to remove the vulnerability, if deemed appropriate.

Overall, the functionality described herein provides a reasoned and structured way of identifying useful information that is missing from a dev guide and/or an SDK's implementation. This facilitates the design process and yields more robust applications.

The above approach can be manifested in various types of systems, components, methods, computer readable storage media, data structures, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A provides an overview of functionality for identifying and acting on implicit assumptions associated with a software development kit (SDK). The functionality includes an SDK development environment and an application development environment. Section B provides additional details regarding the SDK development environment. Section C provides additional details regarding the application development environment. Section D describes illustrative computing functionality that can be used to implement any aspect of the features described in the foregoing sections.

Some of the figures describe concepts in the context of one or more physical components, variously referred to as components, functionality, modules, features, elements, mechanisms, etc. An actual implementation may organize the physical components shown in the figures in any manner. For example, in one case, there may be a one-to-one correspondence between a component shown in the figures and an actual physical mechanism. Alternatively, or in addition, any single component illustrated in the figures may be implemented by plural physical mechanisms. Alternatively, or in addition, any two or more separate components in the figures may reflect different functions performed by a single actual physical mechanism.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks).

Figure 14:
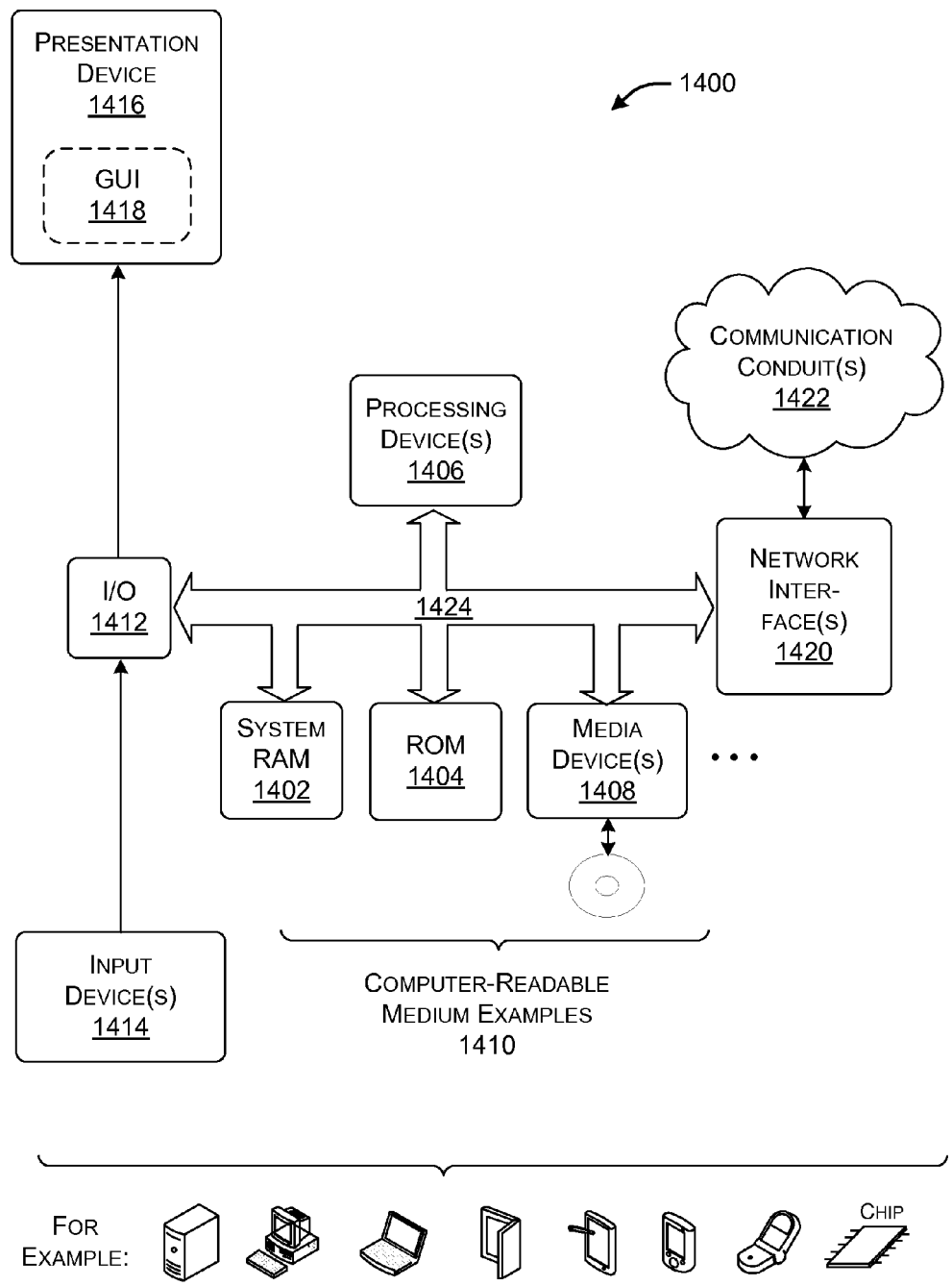
FIG. 14 shows illustrative computing functionality that can be used to implement any aspect of the features shown in the foregoing drawings.

The various components and flowchart blocks can be implemented in any manner by any physical and tangible mechanisms, for instance, by physical mechanisms running and/or storing any kind of software instructions, by hardware components (e.g., chip-implemented logic functionality), etc., and/or any combination thereof. FIG. 14, to be described in turn, provides additional details regarding one illustrative physical implementation of the components shown in the figures.

As to terminology, the phrase "configured to" encompasses any way that any kind of physical and tangible functionality can be constructed to perform an identified operation. The term "logic" encompasses any physical and tangible functionality for performing a task. For instance, each operation illustrated in the flowcharts corresponds to a logic component for performing that operation. When implemented by a computing system, a logic component represents an electrical component that is a physical part of the computing system, however implemented.

The phrase "means for" in the claims, if used, is intended to invoke the provisions of 35 U.S.C. §112, sixth paragraph. No other language, other than this specific phrase, is intended to invoke the provisions of that portion of the statute.

The following explanation may identify one or more features as "optional." This type of statement is not to be interpreted as an exhaustive indication of features that may be considered optional; that is, other features can be considered as optional, although not expressly identified in the text. Finally, the terms "exemplary" or "illustrative" refer to one implementation among potentially many implementations.

A. Overview

Figure 1:
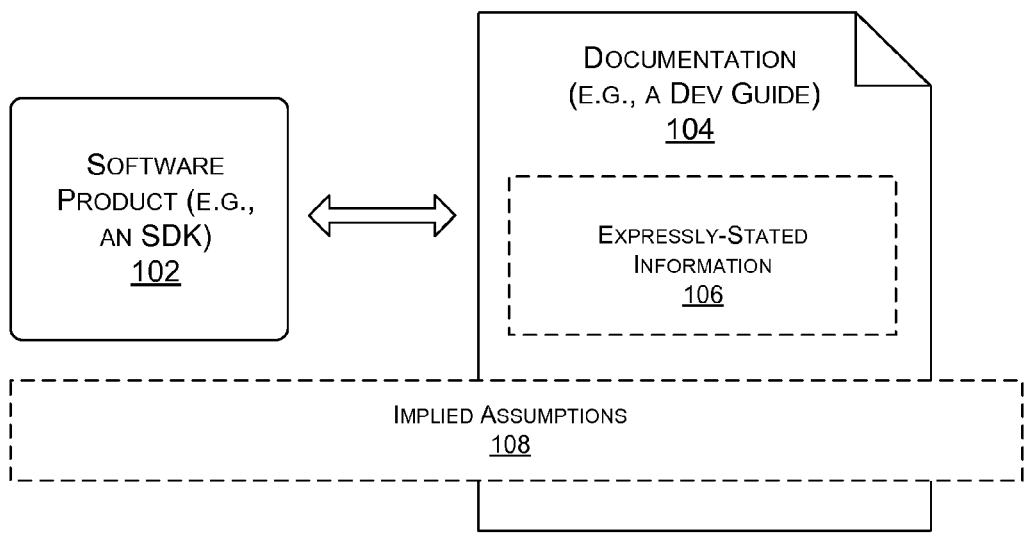
FIG. 1 shows a software product (e.g., an SDK) and documentation (e.g., a dev guide) that may accompany the software product.

FIG. 1 provides a high-level depiction of a software product 102. The software product 102 may correspond to any machine-executable content, such as computer instructions expressed in any language or combination of languages (including markup languages), parameters, settings, etc. Further, the software product 102 may organize its content in any manner. For example, the software product 102 may organize its instructions into one or more modules. In some cases, the software product 102 may represent a software development kit (SDK). To facilitate explanation, this description will henceforth refer to the software product 102 as an SDK.

An application developer may build an application that relies on the SDK in any way. For instance, without limitation, the application can use the SDK to provide one or more functions of any nature. In a more specific case, the application can use the SDK to interact with an independent system which provides one or more functions. In that non-limiting scenario, the SDK may correspond to one or more application programming interfaces (APIs) (for instance).

The application developer may receive the SDK together with documentation 104, referred to as a dev guide herein (or simply "guide" for brevity). The guide provides information that assists an application developer in using the SDK. For example, the guide may include instructions expressed in a natural language that explain the operations performed by the SDK, and the manner in which an application developer may integrate the SDK into an application under development. Alternatively, or in addition, the guide may include code examples which explain the operation and use of the SDK. In one case, the entity which produces the SDK (referred to herein as the SDK developer) also produces the guide. The SDK developer can express the guide in any form or combination of forms, such as printed material, electronic content, and so on.

The guide may be conceptualized as containing explicitly-stated information 106. Further, the SDK and the guide may be associated with zero, one or more implied assumptions 108. As the name suggests, the explicitly-stated information 106 provides instructions that are clear and explicit on their face. By contrast, each implied assumption corresponds to information that: (a) is not explicitly stated in the guide; and (b) is useful (or necessary) to an application developer in properly using the SDK. In some cases, an application developer is given no clear statement or instruction by the guide as to the existence of the implied assumptions 108. This may cause many application developers to "miss" the implied assumptions. In other cases, a skilled application developer may be able to infer an implied assumption based on information that is provided in the guide, together with his or her prior experience and knowledge. But nevertheless, it cannot be expected that all application developers will make these kinds of sophisticated inferences.

More formally stated, an implied assumption is not just any missing or hidden information, but information that an application developer relies on to achieve one or more objectives. A stated object may entail the production of an application that has certain characteristics. For example, the application developer may wish to use the SDK to perform an authentication operation and/or authorization operation. Here, the application developer will wish to gain knowledge of the implied assumption in order to produce a secure application. Otherwise, the application that is produced may be subject to attacks from malicious entities (to be described in greater below).

The presence of implied assumptions 108 in the guide (if any) may ensue from one or more factors. For example, the SDK developer may fully intend to put certain details into the guide, but may forget to do so. Alternatively, or in addition, the SDK developer may misjudge the target audience of the SDK, resulting in a failure to put sufficient detail into the guide, and/or a failure to express the detail in a form that is appropriate for the target audience. Alternatively, or addition, the SDK developer may not fully take into consideration the contextual setting in which an application developer intends to use an application. As will be described at length below, a contextual setting raises a host of issues which impacts the integrity of the application that is constructed using the SDK. More generally stated, the SDK developer may fail to produce a sufficiently detailed guide because he or she relies on an informal and ad hoc approach to developing the guide.

Whatever the cause, a guide that fails to explicitly set forth the implied assumptions 108 is not a good thing; it handicaps the application developer who relies on the guide in building his or her application, and may lead to the production of a faulty application. This problem is particularly pernicious with respect to SDKs, since many applications are constructed based on the SDKs, not just a single application.

To address this problem, a framework is described herein for determining if the SDK and guide are associated with any implied assumptions 108. The framework also incorporates various tools and tactics for addressing the presence of any detected implied assumptions 108. The goal of these tools and tactics is to: (a) eliminate or reduce the presence of the implied assumptions 108; and/or (b) detect the presence of vulnerabilities in applications which ensue from the implied assumptions 108.

This section provides an overview of the framework, while later sections provide additional details on individual parts of the framework.

Figure 2:
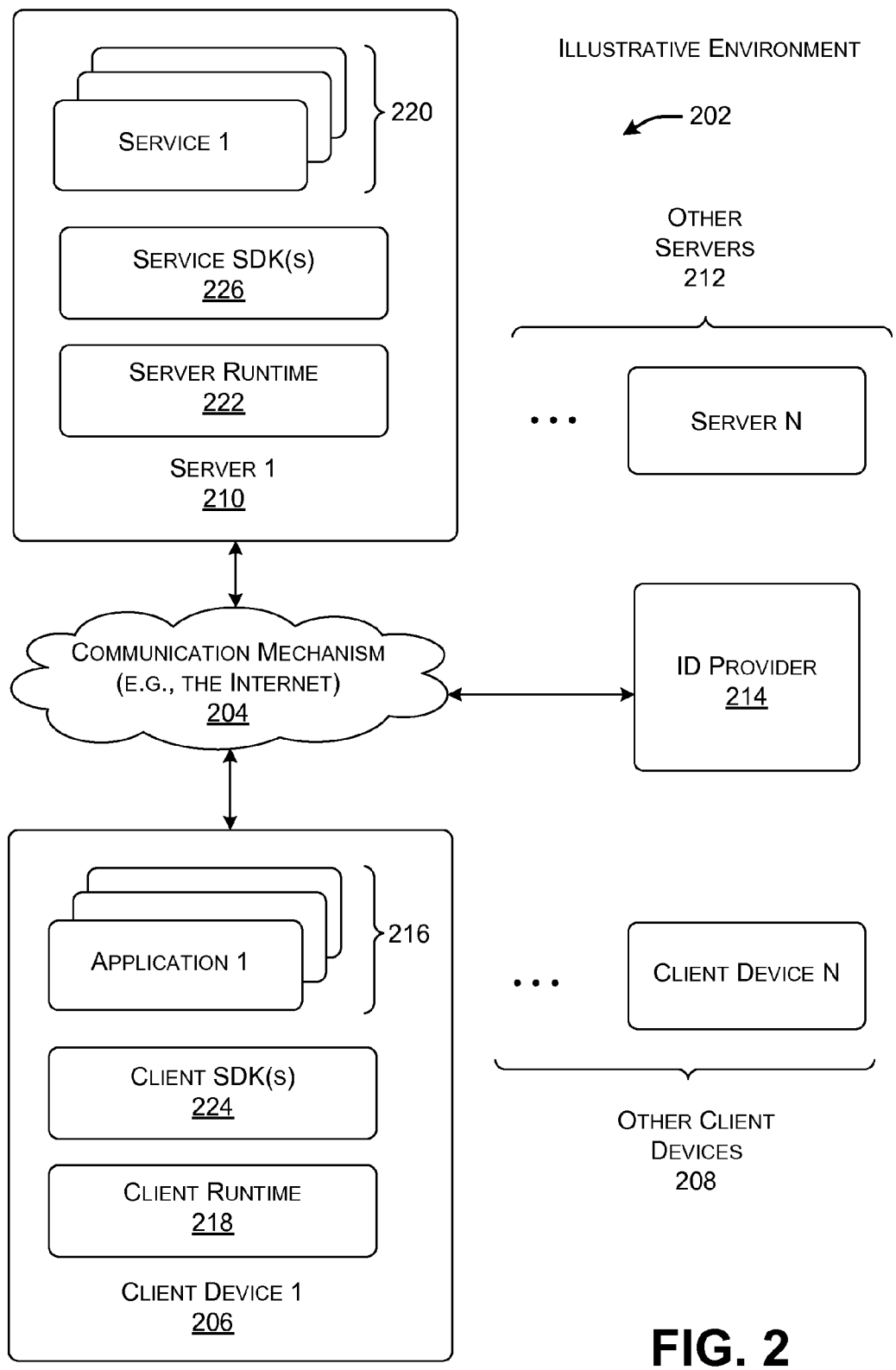
FIG. 2 shows an illustrative environment in which applications may be run. At least some of these applications may rely on a service provided by a remote server.

To begin with, FIG. 2 sets forth an environment 202 having different entities. These entities play a role in a running illustrative example set forth herein; in that example, the application under consideration uses an SDK to perform an authentication operation and/or an authorization operation. In an authentication operation, the application establishes the identity of a user or other entity. In an authorization operation, the application is granted permissions on behalf of the user or other entity. The permissions are granted by an ID provider (to be described below).

The entities shown in FIG. 2 are coupled together using a communication mechanism 204, e.g., a wide area network (such as the Internet). The entities include a representative client device 206, together with one or more other client devices 208. Each client device can be constructed in any manner, such as a personal computer, a lap top computer, a game console device, a set-top box device, a tablet-type computer, a smartphone, an electronic media consumption device, and so on. The entities also include a representative server 210, together with one or more other servers 212. Each server can be constructed in any manner, e.g., by a server-type computer in optional conjunction with one or more data stores. The entities also include an identification (ID) provider 214. The ID provider 214 provides authentication and/or authorization-related services to applications. The ID provider 214 can be implemented in any manner, such as by one or more servers, together with one or more data stores.

Each client device may store one or more applications. For example, the representative client device 206 stores a collection of applications 216. Each of these applications 216 may perform its functions using a client runtime 218 provided by the client device 206. For example, the client runtime 218 may correspond to HyperText Markup Language (HTML) renderer functionality and a JavaScript engine.

Each server may host one or more services. For example, the server 210 hosts a collection of services 220. Each of these services 220 may perform its functions using a server runtime 222. For example, the server runtime 222 may correspond to PHP functionality or ASP.NET functionality.

Any application, running on any client device, may rely on the functionality provided by a service, running on any server. Hence, the functionality associated with this application may be split between the client device and the associated server. To cite merely one example, an application may rely on a remote service to provide image analysis functions that are too computationally-intensive to perform on the client device. These kinds of applications are referred to herein as service-reliant applications. In other cases, some applications running on a client device may not rely on any services provided by any remote server.

At least some of the applications in the environment 202 may rely on one or more SDKs. For example, an application that runs on the client device 206 may rely on client SDK 224. Further assume that this application also relies on a service provided by the server 210. That service, in turn, may rely on a service SDK 226 to perform its operations. The service SDK 226 may be viewed as the server-side counterpart of the client SDK 224.

In the running example set forth herein, at least one application relies on SDK functionality to interact with the ID provider 214. That is, the application interacts with the ID provider 214 to authenticate a user or other entity, and/or to gain authorization to perform a particular task. This kind of application may also interact with one or more remote services in the manner described above. Or this application may not interact with any remote services.

An application developer may produce any application shown in FIG. 1 in the manner described above, e.g., by making reference to a guide. If the SDK and guide are subject to one or more implicit assumptions, then the developer may produce an application having substandard performance. As noted above, in an authentication/authorization context, substandard performance may expose the application to attack by one or more malicious entities.

Figure 3:
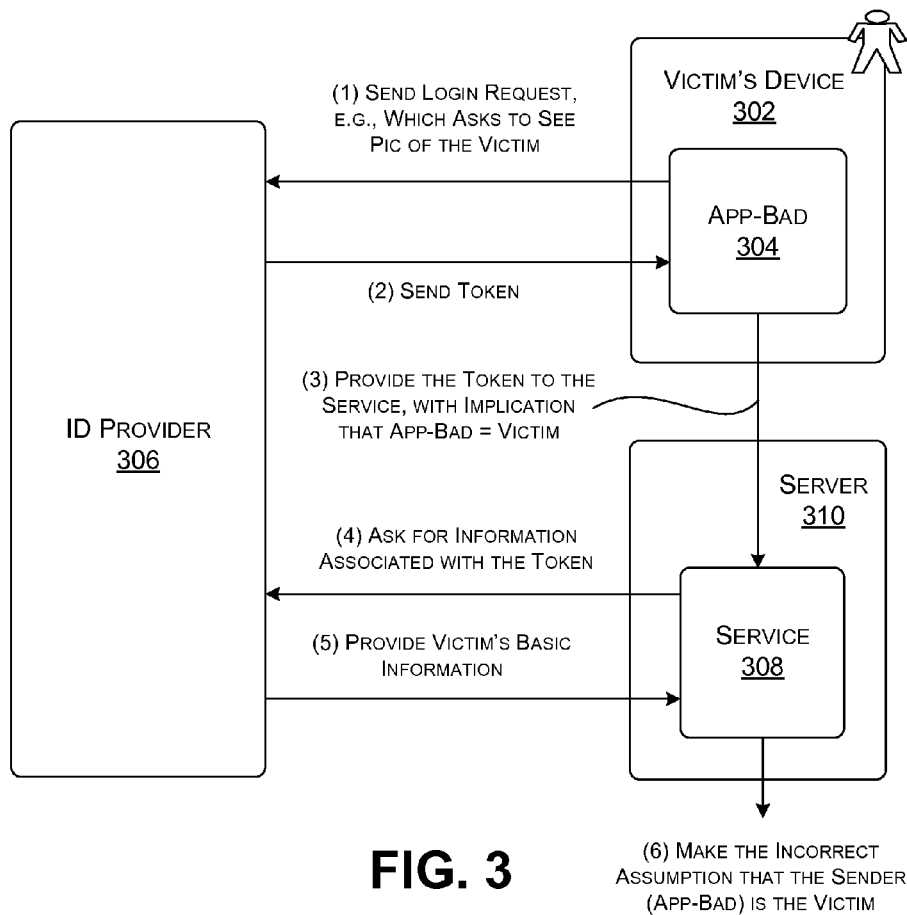
FIG. 3 provides an example of a vulnerability that may arise due to the application developer's lack of knowledge about an implicit assumption associated with an SDK.

To illustrate the above point, consider the scenario shown in FIG. 3. Here, a victim's client device 302 includes a malicious application ("App-Bad") 304. In a first operation (1), the application 304 may interact with the ID provider 306 by sending a login request. By virtue of that request, the application 304 asks the ID provider 306 for a token that will grant the application 304 limited authorization to access certain information. To be concrete, assume that the token grants the application 304 the right to view a user-profile associated with a particular person, such as the victim herself. And further assume that the victim has previously authorized the ID provider 306 to provide this limited information to any recipient. In response, in operation (2), the ID provider 306 returns the requested token to the application 304.

Next, in operation (3), assume that the application 304 sends the token to a service 308 implemented by a remote server 310. Further assume that the application 304 attempts to trick the service 308 by asserting or implying that the application 304, which is sending the token, is the same entity that is identified by the token (which is not true). In operation (4), the service 308 can use the token to ask the ID provider 306 to send basic information that is associated with the entity identified by the token. In operation (5), the ID provider 306 provides the basic information. In operation (6), the service 308 notes that the entity identified by the basic information is the victim, and incorrectly assumes that the sender of the token is the victim. As a consequence of this mistaken association, the malicious application 304 may achieve the ability to interact with the service 308 as if it was the victim himself or herself. In actuality, the token was intended to only grant the application 304 limited authorization to view certain information, not to establish the identity of any entity.

The above problem may ensue from a poorly constructed application, which, in turn, may be the result of one or more hidden assumptions in the SDK's guide. The hidden assumption in this case may be a stipulation that the operations shown in FIG. 3 are to be performed by a single entity, rather than two or more entities in the manner shown in FIG. 3.

More generally, SDKs for service-reliant applications may be particularly prone to implicit assumptions. This is because it may be difficult for an SDK developer to take into account of all the "actors" involved in the execution of a service-reliant application. The actors include, but are not limited to, application functionality that runs on both the client device and server, SDK functionality that runs on both the client device and the server, runtime functionality that runs on both the client device and the server, and so on. For example, the SDK developer may be focusing his or her attention on the integrity of the SDK functionality itself, but the underlying runtime system(s) can also affect the security of the application that is being built based on the SDK.

Figure 4:
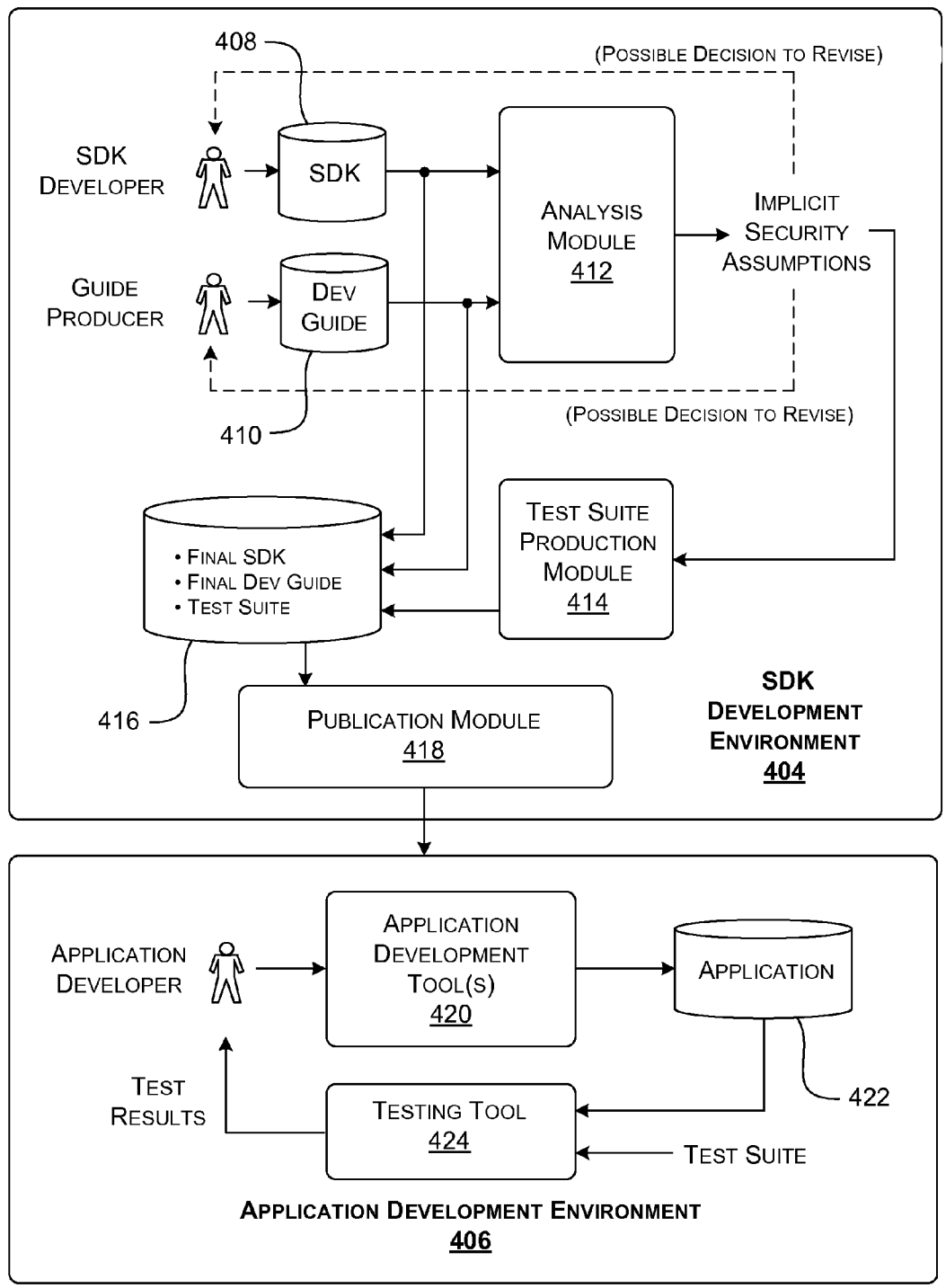
FIG. 4 shows an SDK development environment for analyzing an SDK and its accompanying guide. This figure also shows an application development environment for using the results provided by the SDK development environment in the course of developing an application.

FIG. 4 shows a framework 402 that includes an SDK development environment 404 for analyzing an SDK and its accompanying documentation. The framework 402 also shows an application development environment 406 for leveraging the results provided by the SDK development environment 404.

The SDK development environment 404 provides an SDK, which may be stored in a data store 408, and a guide, which may be stored in a data store 410. The SDK development environment 404 may also identify other information that pertains to the target environment in which the SDK is expected to be used, to be described below. An analysis module 412 may analyze the SDK and the guide to provide an output result. The output result can be used to determine whether there are any implicit assumptions associated with the SDK (and guide). As will be described in greater detail below, the analysis module 412 may operate by performing static analysis on a model. The model represents the SDK and the target environment in which the SDK is expected to be used. The static analysis, in turn, operates by determining whether various assertions associated with the model are violated.

In response to the identified implicit assumptions, an SDK developer may decide to modify the SDK. If successful, this will have the effect of eliminating the vulnerabilities associated with the identified implicit assumptions, and thus eliminating the existence of the implicit assumptions themselves. Alternatively, or in addition, a guide producer (who may be the same person as the SDK developer) may decide to modify the guide. This will have the effect of providing explicit instructions pertaining to the implicit assumptions, thus removing the implicit assumptions.

Alternatively, or in addition, the SDK developer can use the test suite production module 414 to produce a test suite. The test suite includes one or more vulnerability patterns. Each vulnerability pattern is associated with a particular implicit assumption identified by the analysis module 412. More specifically, a vulnerability pattern may represent the negative expression of an assumption. For example, a hidden assumption may indicate that the production of a secure application depends on operations X, Y, and Z being performed by a single entity. A corresponding vulnerability pattern may provide information which describes the situation in which these operations are not performed by the same entity. A vulnerability pattern may also specify externally observable evidence of any nature that will be produced when a hidden assumption is violated.

A data store 416 can store a final SDK, a final guide, and a test suite. This comprises a package of information. A publication module 418 may make any part of the package available to an application developer in any manner. For example, the publication module 418 may post the package to a web page. An application developer may visit that page to select and download any part of the package. In one scenario, it is expected that the application developer will wish to download the entire package.

Now referring to the application development environment 406, an application developer may use one more application tools 420 to produce an application. In doing so, the application developer may rely on information provided in the guide. A data store 422 may store the application.

In addition, the application developer may optionally test the application using a testing tool 424. The testing tool 424 determines whether the application that has been produced has any vulnerability which matches a vulnerability pattern identified by the test suite. If so, the application developer may choose to modify the application and repeat the test. The application developer may repeat these operations until he or she produces an application that is free of "bugs."

Figure 5:
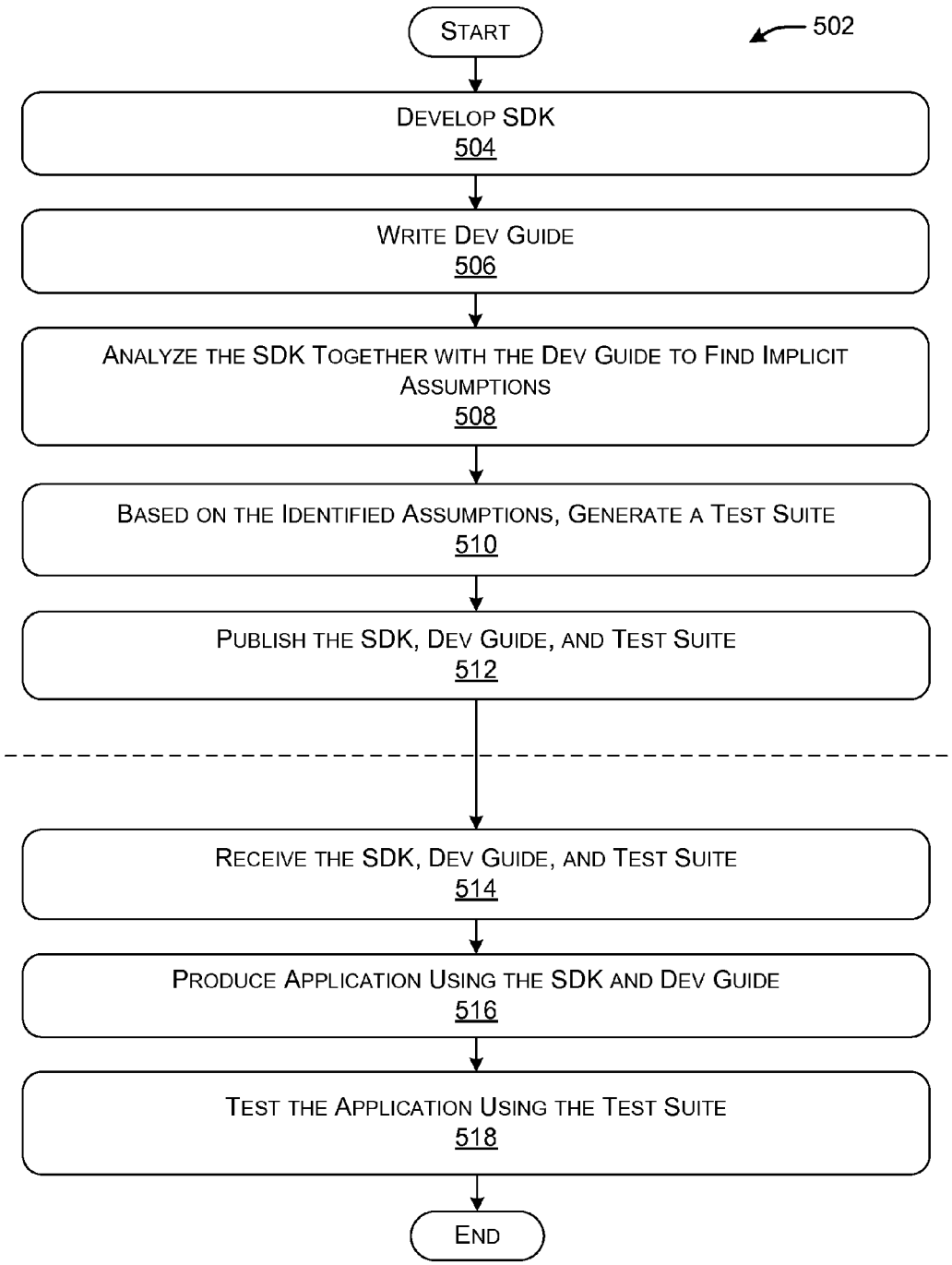
FIG. 5 is a procedure which provides an overview of the functionality depicted in FIG. 4.

FIG. 5 is a procedure 502 which summarizes the functionality depicted in FIG. 4. In block 504, an SDK developer develops an SDK. In block 506, a guide producer writes the guide. In block 508, the SDK developer analyzes the SDK together with the guide to determine whether there are any implicit assumptions associated with the SDK (and guide). In block 510, the SDK developer can generate a test suite based on the identified implicit assumptions. In block 510, the SDK developer can publish the SDK, the guide, and the test suite.

In block 514, an application developer can receive the SDK, the guide, and the test suite. In block 516, the application developer can produce an application using the SDK, based on information provided in the guide. In block 518, the application developer can optionally test the application that has been produced using the test suite.

B. Illustrative SDK Development Environment

Figure 6:
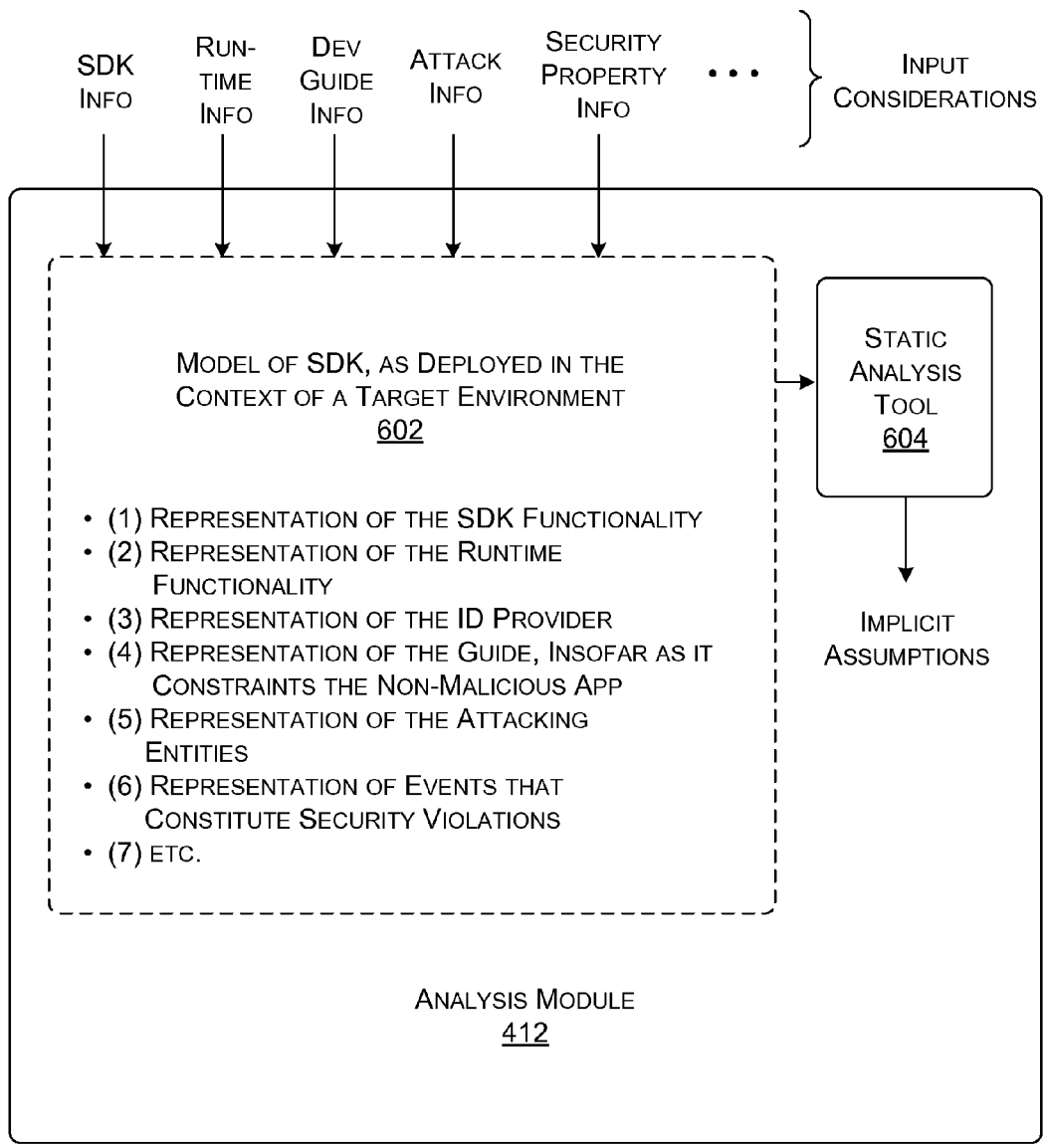
FIG. 6 shows one implementation of an analysis module. The analysis module is a component of the SDK development environment of FIG. 4.

FIG. 6 shows one implementation of the analysis module 412 introduced in FIG. 4. The analysis module 412 can be used to analyze any kind of SDK. But to make the explanation more concrete, assume that the analysis module 412 performs analysis on an SDK that provides an authentication and/or authorization function. In that context, the analysis module 412 seeks to determine whether an application (which is built using the SDK and guide) may expose one or more security-sensitive (SS) items to a malicious entity. Without limitation, an SS item may correspond to secrets, such as access tokens, secret codes defined by a protocol, refresh tokens, application secrets, session IDs, and so on. An SS item may also correspond to signed data provided by the ID provider 214 (of FIG. 2), such as signed messages, authentication tokens, etc.

Further, the analysis module 412 performs its security analysis by examining individual sessions between a client device and a server, rather than associations between a user and a client device, or a user and a service. That is, the end result of authentication/authorization between a client device and a server is to know whom the session represents and what the session is permitted to do. This determination will not affect the status of any other session between the same client device and server.

The analysis module 412 operates on a model 602. The model 602 represents information pertaining to the SDK and the context in which an application (which uses the SDK under consideration) is expected to be deployed. The analysis module 412 also includes a static analysis tool 604 for symbolically investigating the model 602. This yields an output result, which, in turn, may indicate the presence of zero, one or more implicit assumptions.

Figure 7:
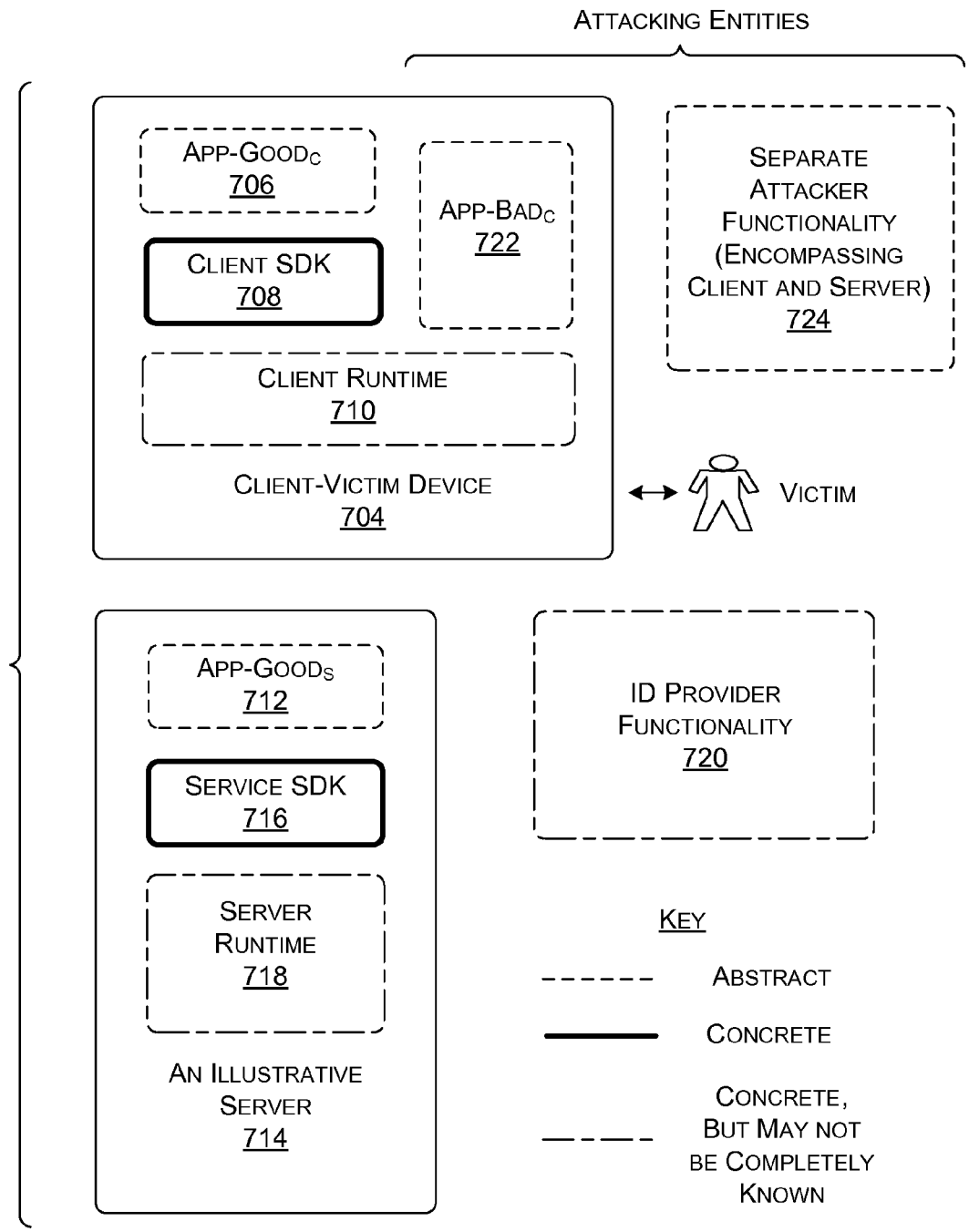
FIG. 7 shows an illustrative environment in which an SDK may be used. The analysis module (of FIG. 6) operates on a model which may take into consideration the entities shown in FIG. 7.

The model 602 expresses the context in which an application (which uses the SDK) is deployed by taking into account different actors that may play a role in interacting with the application, when the application is deployed in its intended target environment. FIG. 7 shows one such illustrative target environment 702. The environment 702 is framed from the perspective of a particular client device which may be the subject to attack from other entities. That client device is referred to herein as client-victim device 704. A person identified as a victim interacts with this device. The client-victim device 704 runs a non-malicious client application (App-Good$_C$) 706 that is assumed to be constructed in accordance with the guide, and which is purposely installed by the victim. In one case, the non-malicious client application (App-Good$_C$) 706 relies on a client SDK 708 and a client runtime 710 to perform its functions.

The non-malicious client application (App-Good$_C$) 706 also relies on a counterpart non-malicious service application (App-Good$_S$) 712 provided by an illustrative server 714. The non-malicious service application (App-Good$_S$), in turn, relies on a service SDK 716 and a server runtime 718 to perform its functions. Finally, the client SDK 708 and the service SDK 716 may interact with ID provider functionality 720 on behalf of the non-malicious client application (App-Good$_C$) 706, but the non-malicious client application (App-Good$_C$) 706 does not directly interact with the ID provider functionality 720.

The environment 702 may also represent one or more attacking entities (also referred to herein as malicious entities) which present a potential threat to the victim. For example, the client-victim device 704 may include at least one malicious client application (App-Bad$_C$) 722 having an unknown origin and construction, and which is therefore considered as potentially malicious. As noted above, the non-malicious client application (App-Good$_C$) 706 is assumed to have been constructed in accordance with the instructions provided in the guide. In contrast, the malicious client application (App-Bad$_C$) 722 can be produced in an arbitrary manner without reference to the guide. Nevertheless, the malicious client application (App-Bad$_C$) 722 can be expected to conform to whatever constraints are imposed by the client runtime 710.

The environment 702 may also include separate attacker functionality 724 that is deployed on some client device other than the client-victim device 704. More specifically, the separate attacker functionality 724 may collectively represent the other client device in conjunction with any services with which that client device interacts.

The construction of certain modules shown in FIG. 7 is known at the time that the SDK is being analyzed. These already-constructed modules are referred to as concrete modules, and include the client SDK 708, the service SDK 716, the client runtime 710, the server runtime 718, and the ID provider functionality 720. More specifically, the client runtime 710, the server runtime 718, and the ID provider functionality 720 are complex; hence, although these modules are concrete, the functionality associated with these modules may not be fully known by the SDK developer. In contrast, the client SDK 708 and the service SDK 716 are typically relatively small programs that are publically available; hence, the functionality associated with these modules may be considered fully known by the SDK developer.

The remaining modules are considered abstract because their constitution is not yet determined. These modules include the non-malicious client application (App-Good$_C$) 706, the non-malicious server application (App-Good$_S$), the malicious client application (App-Bad$_C$) 722, and the separate attacker functionality 724. For example, at the time that the SDK is analyzed, the SDK developer has no knowledge about the applications that an application developer will build based on the SDK. And at the time that the SDK is analyzed, the SDK developer has no knowledge about what malicious entities may pose a threat to the non-malicious client application, even those these malicious entities may already physical exist.

Returning now to FIG. 6, the model 602 may express the following information regarding the components shown in FIG. 7, or a subset thereof, or any variation thereof.

Functions of the SDK and the Underlying System Environment.

The model 602 may represent various functions performed by the client SDK 708 and the service SDK 716. In addition, the model 602 may represent various functions associated with the underlying system environment in which an application will be executed. The system environment includes the client runtime 710 employed on the client-victim device 704 and the server runtime 718 employed by the server 714. The underlying system environment may also encompass aspects of the ID provider functionality 720.

As noted above, the client SDK 708 and service SDK 716 are typically small programs. Hence, the model 602 can exhaustively express all of the functions associated with these modules. On the other hand, the underlying system environment is typically complex and encompasses a wide range of functions. The model 602 may therefore selectively capture those aspects of the system environment that are pertinent to the objective of analysis. In the running example of this section, the objective of analysis pertains to authentication and/or authorization. The model 602 will therefore focus on those aspects of the system environment which have a bearing on the security of an application which uses the SDK.

For example, the model 602 can capture that manner in which the ID functionality 720 interacts with the non-malicious client application (App-Good$_C$) 706, as controlled by various application settings. For instance, a particular ID provider may provide an interface that allows an application developer to enter various application settings, such as application ID, application secret, service website domains, return URL, etc. The model 602 can capture the manner in which these settings affect the behavior of the ID provider functionality 720. As another example, the model 602 can capture the same-origin policy of the client runtime 710. A same-origin policy defines a manner in which the client runtime 710 distinguishes between content originating from different sources. As another example, the model 602 can capture the manner in which the server runtime 718 manages sessions. These features are cited by way of example, not limitation; in other implementations, the model 602 can express other aspects of the underlying system environment.

Development Guide.

As noted above, the non-malicious application modules (App-Good$_C$ 706 and App-Good$_S$ 712) are abstract modules because they have a not-yet-determined construction. Hence, the model 602 cannot represent these components in the same manner as the concrete modules. Nevertheless, the model 602 can express certain constraints specified by the guide, insofar as they affect the construction of the non-malicious client application (App-Good$_C$) 706 and the non-malicious service application (App-Good$_S$) 712. That is, the guide governs which functions these modules can call and what values they can pass when making a call. The guide further expresses the expected order of function calls and the manner in which their argument values and return values are related. A call that does not follow the ordering and argument rules in the guide is considered a non-conforming call. In a sense, the guide constitutes a skeleton that all conformant applications are expected to incorporate; an application can add functions to this skeleton, but it cannot modify the skeleton.

Attacking Entities.

The malicious client application (App-Bad$_C$) 722 and the separate attacker functionality 724 are also abstract, meaning that their constructions are not known at the time of analysis. Further, these entities are not expected to conform to any aspect of the guide. But the model 602 can indicate that either of the malicious entities will store a security-sensitive (SS) item in a knowledge pool when they receive the SS item as a result of a function call. Hence, the knowledge pool will reflect a history of the SS items acquired by these entities. The model 602 further specifies that either of these malicious entities is capable of retrieving any SS item from the knowledge pool and using it any manner that is permitted (by any environment-specific constraints that may apply to the malicious entities).

Security Assertions.

The model 602 can also define the circumstances which constitute a violation of whatever objective that is being sought. In the running security-related example, the model 602 can express the events that constitute a security violation.

One violation pertains to authentication. Assume that some knowledge, k, is about to be added to the knowledge pool by the malicious client application (App-Bad$_C$) 722 or the separate attacker functionality 724. Further assume that k is sufficient to convince the authentication logic of the non-malicious service application (App-Good$_S$) 712 that the knowledge holder is the victim. This implies that either the malicious client application (App-Bad$_C$) 722 or the separate attacker functionality 724 can authenticate as the victim, which constitutes an authentication violation.

Another violation pertains to authorization. In one case, assume that k represents some SS item associated with the victim, such as the victim's access token, session ID (for the session between App-Good$_C$ and App-Good$_S$), etc. This implies that an attacking entity has acquired the permission to perform any operations that the session is authorized to perform. In other cases, the attacking entity may acquire the permission to interact with the ID provider functionality 720 in the same manner as the victim.

Another violation pertains to association. A correct association is established when three pieces of data are correctly bound together: a user's identity (representing the outcome of authentication), the user's permissions (representing the outcome of authorization), and the session's identity (usually referred as session ID). A binding violation occurs when a malicious entity is bound to a victim in any way, e.g., by binding a malicious entity with the victim's permissions, or by binding a malicious entity's session to the victim's identity, and so on.

More specifically, the model 620 can express the security-related goals of its analysis as a set of assertions. Each assertion expresses a property that is expected to be met when an application (which uses the SDK) runs on a runtime system. The model 620 can add those assertions at appropriate junctures in the model 602. For example, the model 620 can add an assertion whenever a malicious entity attempts to add an SS item to the knowledge pool. That assertion may stipulate that the knowledge, k, being added to the knowledge pool is not a secret associated with the victim or the non-malicious application. In addition, or alternatively, an assertion may stipulate that the knowledge k cannot contain any field that indicates the identity of the victim (e.g., in the case in which the knowledge k is a piece of signed data provided by the ID provider functionality 720). In addition, or alternatively, an assertion may stipulate that no API on the ID provider functionality 720 takes k as an input and sends back the victim's identity in response. These kinds of assertions are cited way of example, not limitation.

The model 602 can also add an assertion for every binding operation in which an association is made between a user identity, a permission, and a session ID, or any pair of these data items. For example, the assertion may stipulate that, if the user ID or permission represents the victim, the session is likewise expected to be associated with the victim. Another assertion may stipulate that, if an operation binds a user ID and a permission, either both of them or neither of them are expected to represent the victim.

In terms of physical implementation, the model 602 can be formed as a program expressed in any language. The assertions may be added to particular statements in the program, at junctures in the program that have a bearing on the objective that is being sought.

The static analysis tool 604 analyzes the above-described model 602 to provide an output result, which may indicate the presence of implied assumptions, if any. The static analysis tool 604 can use any static analysis technique to perform this task. In general, static analysis involves analyzing the execution paths of a program in the symbolic domain, as opposed to dynamically executing the program.

Figure 8:
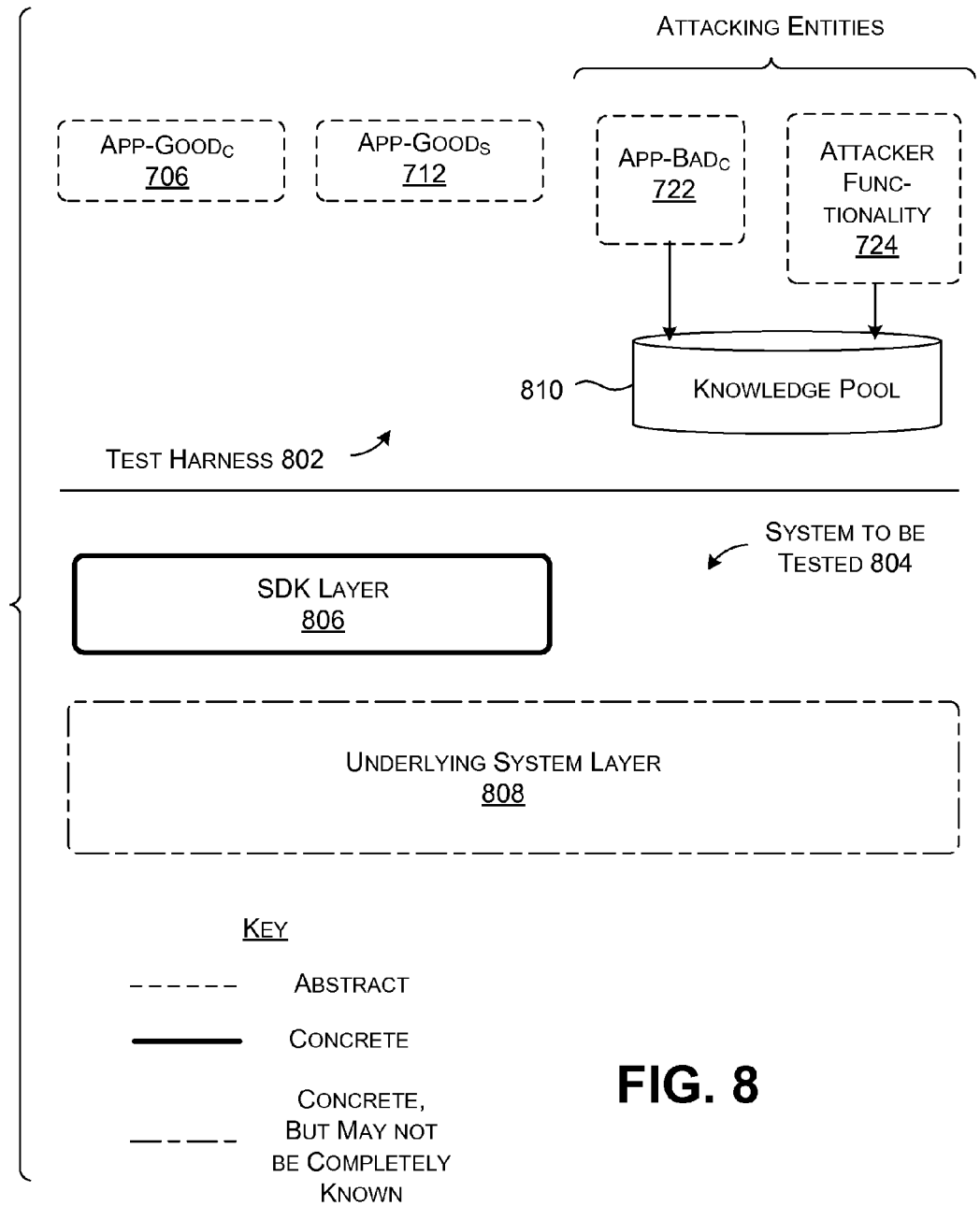
FIG. 8 shows, in high-level form, one implementation of the analysis module of FIG. 6.

FIG. 8 shows, in high-level form, the operation of the static analysis tool 604. A test harness 802 is associated with the abstract modules described above, including the non-malicious client application (App-Good$_C$) 706, the corresponding non-malicious service application (App-Good$_S$ 712), the malicious client application (App-Bad$_C$) 722, and the separate attacker functionality 724. The test harness 802 performs operations which affect a system 804 to be tested. That system 804 includes an SDK layer 806 and an underlying system layer 808, also referred to as an underlying system environment herein. The SDK layer 806 collectively represents the client SDK 708 and the service SDK 716. The underlying system layer 808 collectively represents the client runtime 710, the server runtime 718, and the ID provider functionality 720.

In one implementation, the test harness 802 operates by non-deterministically invoking its abstract modules. The act of calling an abstract module may eventually result in a call being made to the system 804 being tested. The test harness 802 can store knowledge k in a knowledge pool 810 whenever the malicious client application (App-Bad$_C$) 722 is called, or whenever the separate attacker functionality 724 is called. The static analysis tool 604 can then determine whether this event will violate any stated assertions. In addition, the static analysis tool 604 can determine whether any invoked function will violate any binding-related assertion. The SDK developer can examine the violations, if any are detected, to determine whether there are any implied assumptions associated with the SDK.

Figure 9:
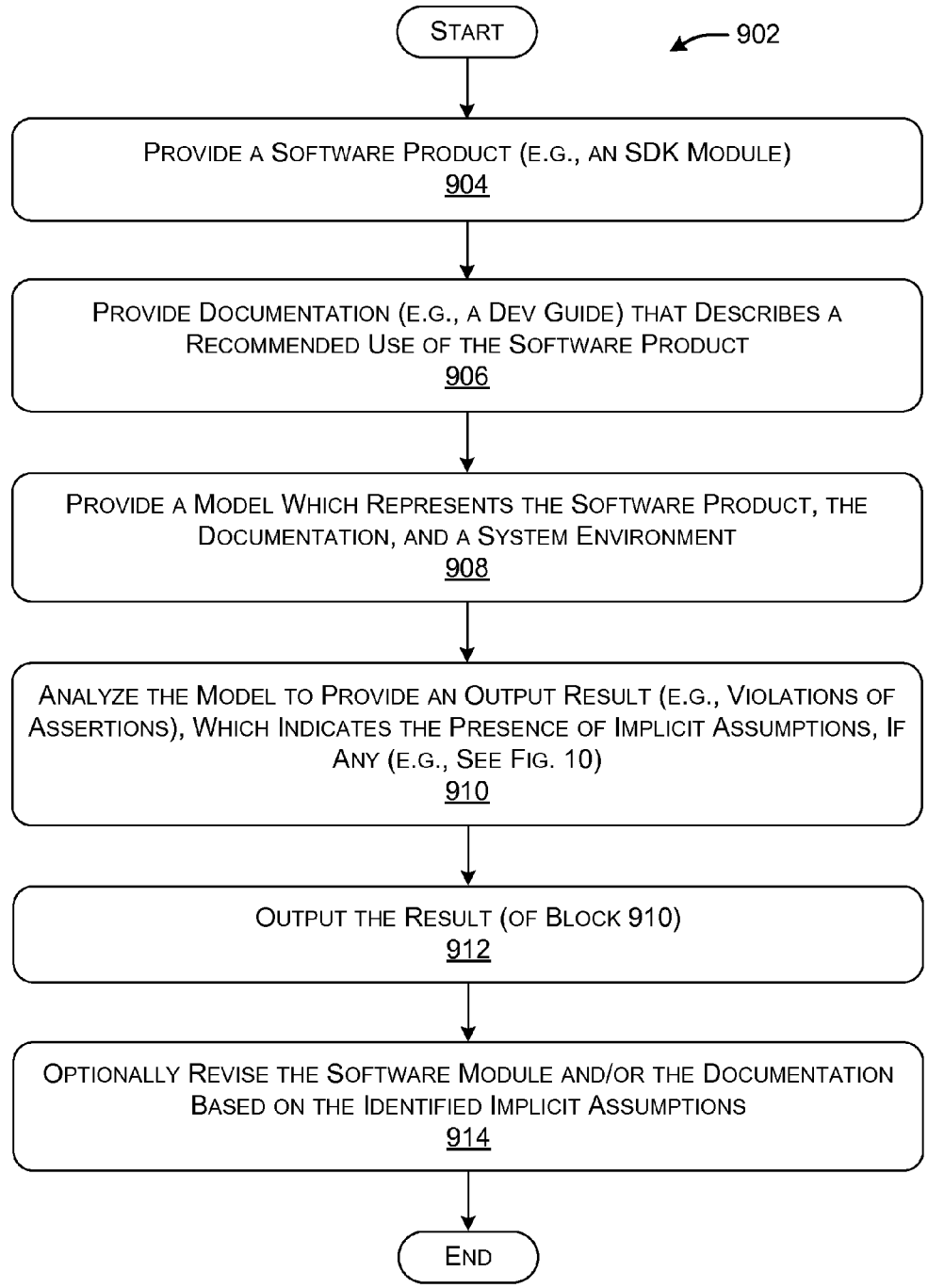
FIG. 9 is a procedure which describes one manner of operation of the analysis module of FIG. 6.

FIG. 9 is a procedure 902 which describes one manner of operation of the analysis module 412 of FIG. 6. In block 904, the SDK development environment 404 provides a software product, such as an SDK. In block 906, the SDK development environment 404 provides documentation (e.g., a dev guide) that describes a recommended use of the SDK. In block 908, the SDK development environment 404 provides the model 602 which represents at least the SDK, the guide, and the system environment (e.g., the runtime environment(s) and the ID provider functionality, etc.). In block 910, the analysis module 412 analyzes the model 602 to determine if the model is subject to any violations (e.g., of security-related assertions), which may indicate that there are implicit assumptions associated with the SDK (and guide). In block 912, the analysis module 412 can provide an output which conveys the violations. In block 914, the SDK developer can optionally revise the SDK, and/or the guide producer can optionally modify the guide, both with the objective of eliminating or reducing the identified implied assumptions.

Figure 10:
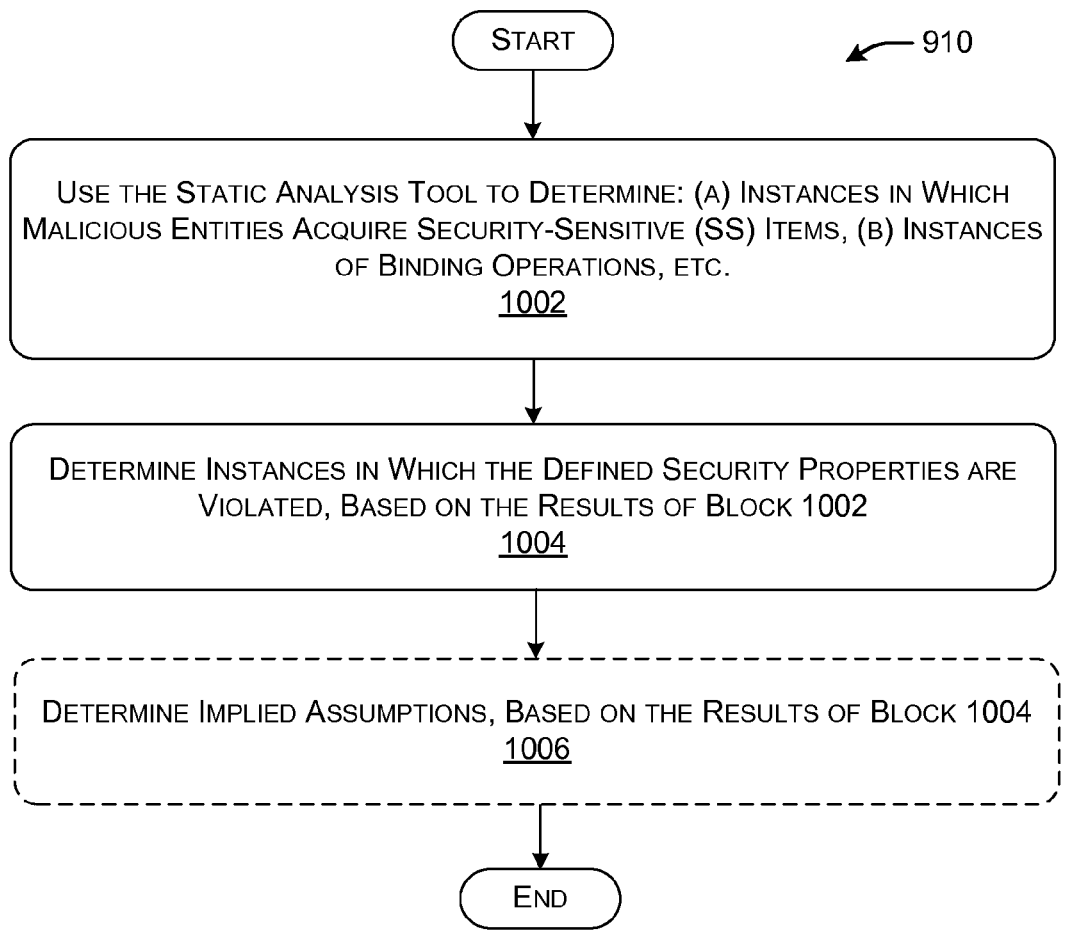
FIG. 10 is a procedure which describes further illustrative details of the operation of the analysis module of FIG. 6.

FIG. 10 is a procedure which describes further illustrative details of the operation of the analysis module 412 of FIG. 6, associated with block 910 of FIG. 9. In block 1002, the analysis module 412 uses the static analysis tool 604 to determine: (a) instances in which malicious entities acquire security-sensitive (SS) items; and (b) instances in which a binding operation is performed among a user identity, a permission, and a session, or any pair thereof. In block 1004, the analysis module 612 determines, based on the results of block 1002, instances in which the defined security properties are violated. In block 1006, an SDK developer or other individual determines, based on the results of block 1004, the presence of implied assumptions associated with the SDK.

Figure 11:
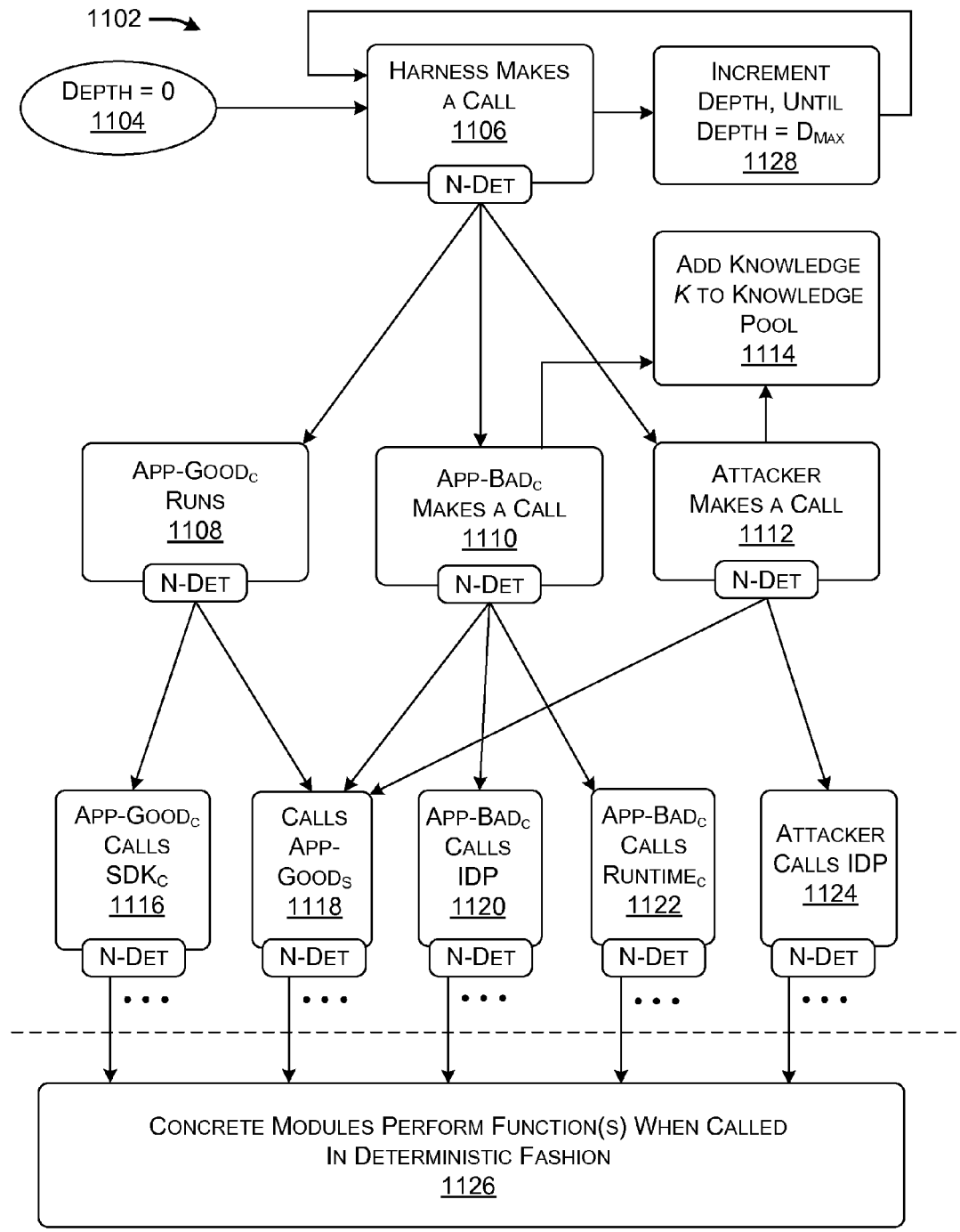
FIG. 11 is a procedure which describes further illustrative details of the operation of the analysis module of FIG. 6.

FIG. 11 is a procedure 1102 which describes further illustrative details of the operation of the analysis module 412 of FIG. 6. In block 1104, the analysis module 412 initializes a depth counter to zero. In block 1106, the analysis module 412 makes a non-deterministic call to one or three functions implemented by the abstract modules, including an "App-$Good_C$ Runs" 1108 function performed by the non-malicious client application (App-$Good_C$) 706, an "App-$Bad_C$ Makes a Call" function 1110 performed by the malicious client application (App-$Bad_C$) 722, and an "Attacker Makes a Call" function 1112 performed by the separate attacker functionality 724. The functionality labeled "N-Det" in FIG. 11 corresponds to a non-deterministic (e.g., a random) selection of one of a plurality of possible options. If either the "App-$Bad_C$ Makes a Call" function 1110 or the "Attacker makes a Call" function 1112 is called, then a function 1114 will store whatever knowledge is acquired from this call into the knowledge pool data store 810.

Each of the above-noted functions (1108, 1110, 1112) can, once called, non-deterministically select a child function. FIG. 11 indicates that the child functions include: a "App-$Good_C$ calls $SDK_S$" function 1116, which indicates that the client SDK 708 is called; a "Calls App-$Good_S$" function 1118, which indicates that the non-malicious service application (App-$Good_S$) 712 is called; an "App-$Bad_C$ Calls IDP" function 1120, which indicates that the ID provider functionality 720 is called; an "App-$Bad_C$ Calls $Runtime_C$" function 1122, which indicates that the client runtime 710 is called; and an "Attacker Calls IDP" function 1124, which indicates that the ID provider functionality 720 is called.

Each of these child functions, when it is called, can then non-deterministically invoke a function in the underlying system layer 808 (shown in FIG. 8). Block 1126 indicates that the concrete module(s) in that system layer 808 perform appropriate functions when they are called. Because these modules are concrete, the operations within block 1126 correspond to deterministic computations.

More specifically, for each depth increment, the analysis module 412 explores all paths through the non-deterministic switches described above, e.g., based on its execution of the model 602 in the symbolic domain. This may result in the storage of knowledge in the knowledge pool data store 810. In block 1128, the analysis module 412 increments the depth counter and repeats the above-described analysis, e.g., by again exploring all paths through the non-deterministic switches, and adding any additional knowledge to the knowledge pool data store 810. The analysis module 412 repeats this operation until it reaches a final depth threshold, such as, without limitation, 5 iterations. This procedure 1102 therefore defines a bounded search. Alternatively, the analysis module 412 can perform analysis in a non-bounded manner using a theorem prover, such as the Z3 theorem provider provided by Microsoft® Corporation of Redmond, Wash.

An SDK developer, based on the results of the analysis module 412, can identify different types of implicit assumptions, depending on the nature of the SDK under consideration, its corresponding guide, and the underlying system environment. To cite merely one example, the analysis module 412 can analyze an application which relies on a service, where that service runs in a subdomain provided by a particular server. Assume that a malicious entity interacts with another subdomain on the same server. In view of certain same-origin policies that may apply within the system environment, this scenario may provide an attack path through which the malicious entity can assign a victim's identity to a session ID of its choosing. A relevant assumption for this scenario specifies that no subdomain can be owned by a malicious entity.

In closing, the running example presented in this section corresponds to the case in which the objective of analysis is to identify security-related implicit assumptions. But more generally, the analysis module 412 can analyze an SDK with respect to any objective or combination of objectives. For example, the analysis module 412 can rely on a model that has embedded assertions that pertain to resource utilization, rather than security. The SDK developer can use the analysis module 412 to determine whether the SDK is associated with any consumption-related implicit assumptions. For example, a particular assumption may indicate that a particular module is expected to be employed on a particular server in order to avoid high memory usage.

C. Illustrative Application Development Environment

Figure 12:
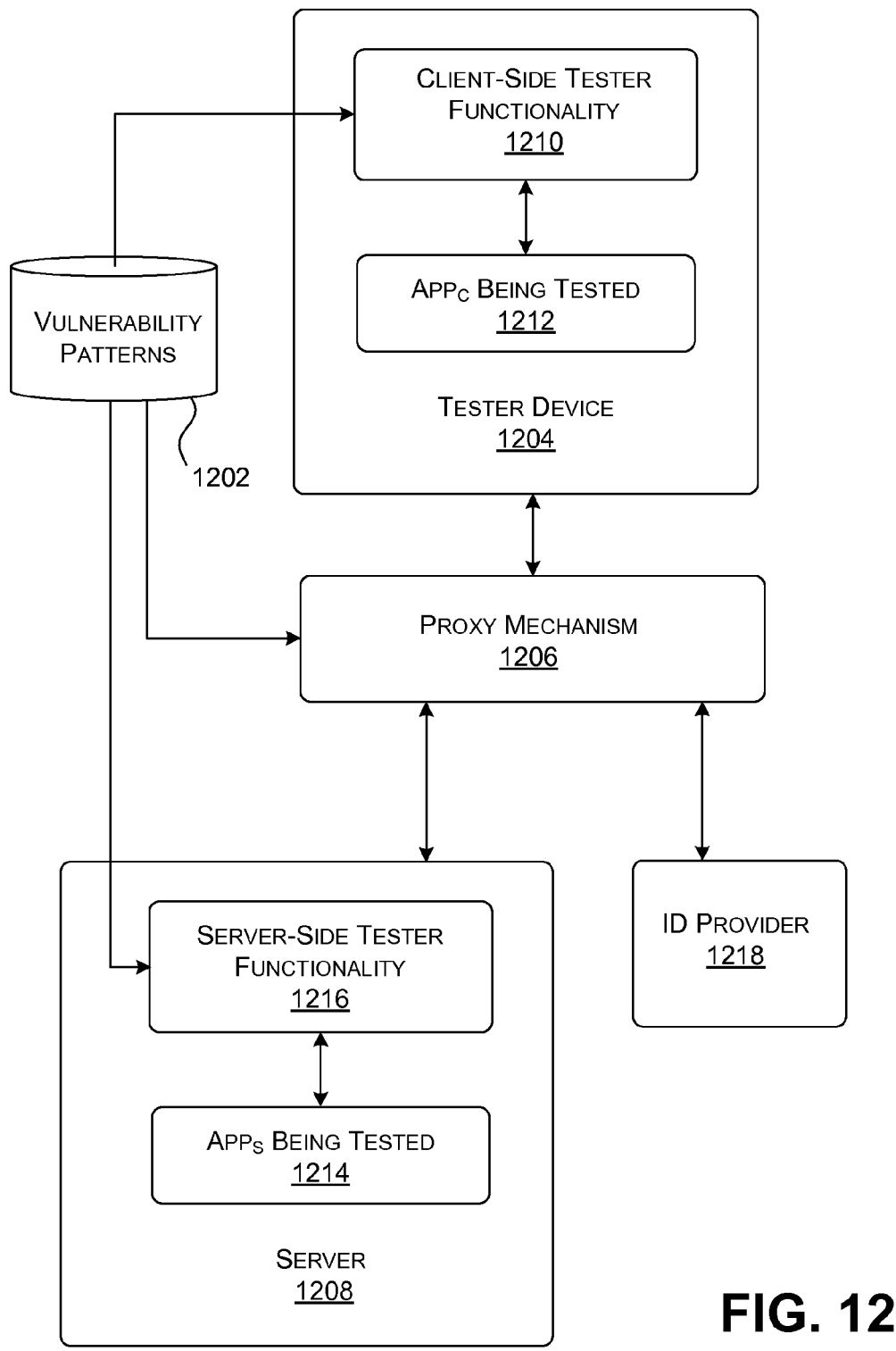
FIG. 12 shows one implementation of a testing tool provided by the application development environment of FIG. 4.

FIG. 12 shows one implementation of the testing tool 424 provided by the application development environment of FIG. 4. The testing tool 424 performs tests based on a test suite comprising one or more vulnerability patterns stored in a data store 1202. The test suite production module 414 (of FIG. 4) produces the test suite. In one case, the test suite production module 414 corresponds to a conversion module or lookup table which converts each implicit assumption to a vulnerability pattern. Alternatively, or in addition, a user (e.g., the SDK developer) may generate the vulnerability patterns.

In the illustrated example, the testing tool 424 performs dynamic analysis on the applications based the vulnerability patterns. Alternatively, or in addition, the testing tool 424 can perform static analysis of the applications.

The testing tool 424 can include functionality that is spread among a client-side tester device 1204, a proxy mechanism 1206, and a server 1208. The tester device 1204 assumes the role of a client device running the application under consideration. The server 1208 plays the roles of a server that runs a service with which the application may interact. The proxy mechanism 1206 can simulate message exchanges that would be produced in an actual execution environment. The proxy mechanism 1206 also simulates the operation of the separate attack functionality 724.

In operation, client-side tester functionality 1210 first launches a client application (App$_C$) 1212, representing a non-malicious application that is constructed in accordance with a guide. This may (or may not) entail interaction with a corresponding server application (App$_S$) 1214 being tested. Server-side tester functionality 1216 may correspond to testing-related APIs or the like which allow the client application (App$_C$) 1212 to interact with the server application (App$_S$) 1214. The client application (App$_C$) 1212 may also interact with an ID provider 1218 via SDK functionality (not shown). After simulating the operation of the client application (App$_C$) 1212, the client-side tester functionality 1210 can behave as the malicious client application (App-$Bad_C$) 722 (of FIG. 7).

Figure 13:
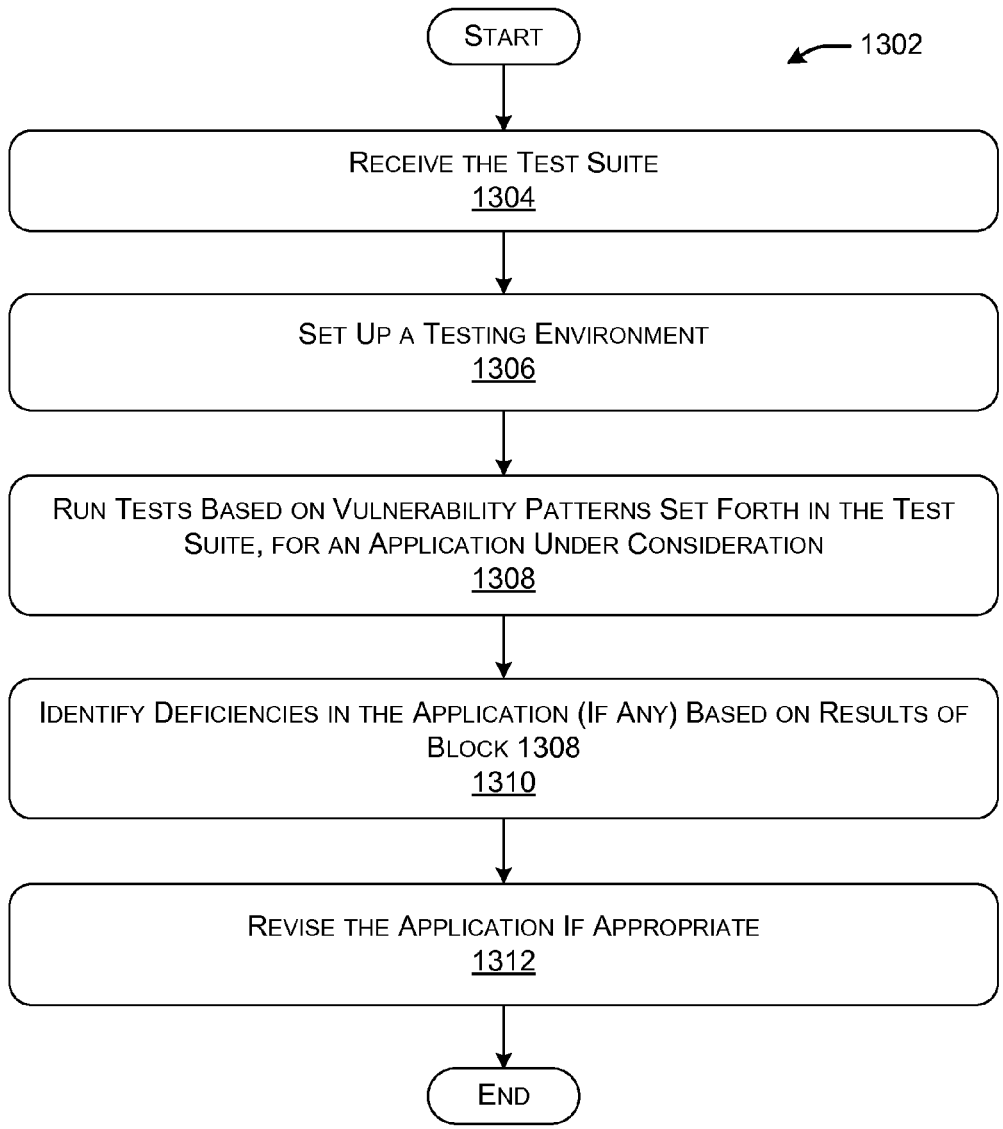
FIG. 13 is a procedure that describes one manner of operation of the application development environment of FIG. 4.

FIG. 13 is a procedure 1302 that describes one manner of operation of the application development environment 406 of FIG. 4. In block 1304, the application development environment 406 receives a test suite associated with a particular SDK. In block 1306, the application development environment 406 sets up a test environment, such as the configuration shown in FIG. 12. In block 1308, the application development environment 406 runs a test for each vulnerability pattern specified in test suite, e.g., by analyzing one vulnerability at a time. In block 1310, the application development environment 406 identifies any deficiencies in the application based on the results of block 1310. In block 1312, an application developer may choose to modify the application to address the shortcomings identified in block 1310.

D. Representative Computing Functionality

FIG. 14 sets forth illustrative computing functionality 1400 that can be used to implement any aspect of the functions described above. For example, the type of computing functionality 1400 shown in FIG. 14 can be used to implement any aspect any client device or any server shown in FIG. 2. The type of computing functionality 1400 shown in FIG. 14 can also be used to implement any aspect of the SDK development environment 404 (such as the analysis module 412) and any aspect of the application development environment 406 (such as the testing tool 424) of FIG. 4. In one case, the computing functionality 1400 may correspond to any type of computing device that includes one or more processing devices. In all cases, the computing functionality 1400 represents one or more physical and tangible processing mechanisms.

The computing functionality 1400 can include volatile and non-volatile memory, such as RAM 1402 and ROM 1404, as well as one or more processing devices 1406 (e.g., one or more CPUs, and/or one or more GPUs, etc.). The computing functionality 1400 also optionally includes various media devices 1408, such as a hard disk module, an optical disk module, and so forth. The computing functionality 1400 can perform various operations identified above when the processing device(s) 1406 executes instructions that are maintained by memory (e.g., RAM 1402, ROM 1404, or elsewhere).

More generally, instructions and other information can be stored on any computer readable medium 1410, including, but not limited to, static memory storage devices, magnetic storage devices, optical storage devices, and so on. The term computer readable medium also encompasses plural storage devices. In many cases, the computer readable medium 1410 represents some form of physical and tangible entity. The term computer readable medium also encompasses propagated signals, e.g., transmitted or received via physical conduit and/or air or other wireless medium, etc. However, the specific terms "computer readable storage medium" and "computer readable medium device" expressly exclude propagated signals per se, while including all other forms of computer readable media.

The computing functionality 1400 also includes an input/output module 1412 for receiving various inputs (via input devices 1414), and for providing various outputs (via output devices). Illustrative input devices include a keyboard device, a mouse input device, a touchscreen input device, a gesture input device, a voice recognition mechanism, tabletop or wall-projection input mechanisms, and so on. One particular output mechanism may include a presentation device 1416 and an associated graphical user interface (GUI) 1418. The computing functionality 1400 can also include one or more network interfaces 1420 for exchanging data with other devices via one or more communication conduits 1422. One or more communication buses 1424 communicatively couple the above-described components together.

The communication conduit(s) 1422 can be implemented in any manner, e.g., by a local area network, a wide area network (e.g., the Internet), etc., or any combination thereof. The communication conduit(s) 1422 can include any combination of hardwired links, wireless links, routers, gateway functionality, name servers, etc., governed by any protocol or combination of protocols.

Alternatively, or in addition, any of the functions described in the preceding sections can be performed, at least in part, by one or more hardware logic components. For example, without limitation, the computing functionality can be implemented using one or more of: Field-programmable Gate Arrays (FPGAs); Application-specific Integrated Circuits (ASICs); Application-specific Standard Products (ASSPs); System-on-a-chip systems (SOCs); Complex Programmable Logic Devices (CPLDs), etc.

In closing, the description may have described various concepts in the context of illustrative challenges or problems. This manner of explanation does not constitute an admission that others have appreciated and/or articulated the challenges or problems in the manner specified herein. Further, the claimed subject matter is not limited to implementations that solve any or all of the noted challenges/problems.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method performed by at least one computing device, the method comprising: obtaining natural language documentation relating to a software development kit (SDK), wherein the natural language documentation relating to the SDK describes a recommended use of the SDK by an application in order to achieve a stated objective;
   obtaining a model which represents at least: the SDK, the natural language documentation relating to the SDK, system environment in which the SDK is expected to be used by the application, and assertions pertaining to the stated objective that are expressed as properties expected to be met by the application;
   analyzing the model to provide a result, the analyzing including non-deterministically invoking functions provided by the SDK in accordance with the natural language documentation relating to the SDK; and outputting the result, the result indicating whether there is at least one assumption that is not explicitly stated in the natural language documentation relating to the SDK, but where satisfaction of the stated objective depends on knowledge of said at least one assumption.

2. The method of claim 1, wherein the stated objective is a security-related objective pertaining to one or more of authentication and authorization.

3. The method of claim 1, wherein the application comprises a client application that is provided by a client device and a counterpart service application that is provided by a server.

4. The method of claim 1, wherein the SDK describes how the application is expected to invoke the functions.

5. The method of claim 1, wherein the system environment corresponds to one or more of:
   a runtime system that the application relies on during execution of the application; and
   an ID provider that the application uses to perform at last one of an authentication operation and authorization operation.

6. The method of claim 1, wherein the model also includes a set of assertions that pertain to the stated objective.

7. The method of claim 6, at least one of the assertions is a security assertion.

8. The method of claim 7, wherein the analyzing further comprises detecting a security vulnerability responsive to a violation of the security assertion.

9. The method of claim 1, wherein the model is expressed as a collection of abstract modules and a collection of concrete modules, the abstract modules including an individual abstract module representing the application, each abstract module having a not-yet-determined construction, and each concrete module having an already-determined construction.

10. The method of claim 1, wherein said analyzing comprises statically analyzing the model to determine whether stated assertions are satisfied.

11. The method of claim 1, wherein said analyzing comprises non-deterministically invoking the functions according to a skeleton defined by the natural language documentation relating to the SDK, the skeleton defining an expected order of function calls and relationships between argument values and return values of the functions as explained in the natural language documentation relating to the SDK.

12. The method of claim 11, further comprising storing a security-sensitive item in a knowledge pool responsive to invocation of another function by a malicious entity that results in the malicious entity obtaining the security-sensitive item.

13. The method of claim 1, further comprising generating a test suite that includes at least one vulnerability pattern, each vulnerability pattern corresponding to an associated assumption indicated by the result of said analyzing, and each vulnerability pattern corresponding to a test that can be performed to identify whether the associated assumption has been violated by the application, once the application is constructed based on the natural language documentation relating to the SDK.

14. A software development environment comprising:
a processing device comprising one or more hardware processing units configured to implement an analysis module and a test suite production module,
wherein the analysis module is configured to analyze a software development kit (SDK) in conjunction with a natural language development guide for the SDK that describes a recommended use of the SDK by an application to provide a result, the result indicating whether there is at least one assumption that is not explicitly stated in the natural language development guide for the SDK, but where satisfaction of a stated objective depends on knowledge of said at least one assumption; and wherein the test suite production module is configured to generate a test suite that includes at least one vulnerability pattern, each vulnerability pattern corresponding to an associated assumption that is identified based on the result provided by the analysis module, and each vulnerability pattern corresponding to a test that can be performed to identify whether the associated assumption has been violated by the application, once the application is constructed based on the natural language development guide for the SDK, wherein the analysis module is further configured to represent the application as an abstract module and non-deterministically invoke SDK functions of the abstract module in accordance with constraints expressed in the natural language development guide.

15. The software development environment of claim 14, wherein the processing device is further configured to implement a publication module configured to provide a package comprising: the SDK, the natural language development guide for the software development kit, and the test suite.

16. A computing device comprising:
one or more processing devices; and at least one hardware computer readable storage medium storing computer readable instructions which, when executed by the one or more processing devices, cause the one or more processing devices to:
obtain a model, the model representing:
a software product,
natural language documentation that describes a recommended use of the software product by a non-malicious application in order to achieve a security objective, the non-malicious application,
a system environment in which the software product is expected to be used by the non-malicious application, at least one malicious entity which represents a threat to the nonmalicious application, and
a set of assertions that pertain to the security objective; and
perform an analysis on the model to provide a result, the result indicating whether there is at least one assumption that is not explicitly stated in the natural language documentation, but where satisfaction of the security objective depends on knowledge of said at least one assumption, wherein the analysis includes non-deterministically invoking functions by the non-malicious application in accordance with a skeleton defined by the natural language documentation.

17. The computing device of claim 16, wherein the model represents the non-malicious application and said at least one malicious entity as abstract modules, and wherein the model represents the software product and the system environment as concrete modules, wherein each abstract module has a not-yet-determined construction, and each concrete module has an already-determined construction.

18. The computing device of claim 16, wherein the computer readable instructions, when executed by the one or more processing devices, cause the one or more processing devices to: use static analysis of the model to determine whether the set of assertions are satisfied.

19. The computing device of claim 16, wherein the computer readable instructions, when executed by the one or more processing devices, cause the one or more processing devices to: non-deterministically call other functions that model said at least one malicious entity.

20. The computing device of claim 19, wherein the computer readable instructions, when executed by the one or more processing devices, cause the one or more processing devices to: store a security-sensitive item in a knowledge pool whenever said at least one malicious entity calls an individual other function and obtains the security-sensitive item.

* * * * *